US012698853B2

(12) United States Patent
Schmieder et al.

(10) Patent No.: US 12,698,853 B2
(45) Date of Patent: Aug. 4, 2026

(54) COUPLING DEVICE FOR PRODUCING A NON-PERMANENT HYDRAULIC CONNECTION

(71) Applicant: WTO Vermögensverwaltung GmbH, Ohlsbach (DE)

(72) Inventors: Markus Schmieder, Berghaupten (DE); Karlheinz Jansen, Schutterwald (DE)

(73) Assignee: WTO Vermögensverwaltung GmbH, Ohlsbach (DE)

( * ) Notice: Subject to any disclaimer, the term of this patent is extended or adjusted under 35 U.S.C. 154(b) by 702 days.

(21) Appl. No.: 18/249,856

(22) PCT Filed: Oct. 15, 2021

(86) PCT No.: PCT/EP2021/078694
§ 371 (c)(1),
(2) Date: Apr. 20, 2023

(87) PCT Pub. No.: WO2022/084200
PCT Pub. Date: Apr. 28, 2022

(65) Prior Publication Data
US 2023/0392728 A1 Dec. 7, 2023

(30) Foreign Application Priority Data
Oct. 20, 2020 (DE) .................... 10 2020 127 608.7

(51) Int. Cl.
*F16L 29/04* (2006.01)
*B23B 31/30* (2006.01)
(52) U.S. Cl.
CPC .............. *F16L 29/04* (2013.01); *B23B 31/30* (2013.01)

(58) Field of Classification Search
CPC ...... B23Q 1/0018; B23Q 2003/155404; B23Q 2003/15586; F16L 29/04; B23B 31/30
See application file for complete search history.

(56) References Cited

U.S. PATENT DOCUMENTS

| 4,678,077 A | * | 7/1987 | Bertorello | ............ B23Q 1/0018 269/30 |
| 6,158,780 A | * | 12/2000 | Schaldach | ............ B23Q 1/0009 285/302 |
| 2003/0066564 A1 | * | 4/2003 | Arisato | ................ B23Q 1/0018 137/614.06 |

(Continued)

FOREIGN PATENT DOCUMENTS

| CN | 101952634 A | 1/2011 |
| CN | 207056286 U | 3/2018 |
| DE | 10319796 A1 | 11/2004 |

(Continued)

OTHER PUBLICATIONS

International Preliminary Report on Patentability for PCT/EP2021/078694, dated Feb. 20, 2023. pp. 1-31.

(Continued)

*Primary Examiner* — Seahee Hong
(74) *Attorney, Agent, or Firm* — BOND, SCHOENECK & KING, PLLC; George R. McGuire

(57) ABSTRACT

A coupling device for fluid is proposed which is very simple in construction and requires little installation space, such that it can also be used in stationary or driven tool holders and in other restricted installation situations.

34 Claims, 19 Drawing Sheets

(56)                References Cited

U.S. PATENT DOCUMENTS

| | | | |
|---|---|---|---|
| 2009/0090014 A1 | 4/2009 | Wisniewski | |
| 2010/0096032 A1* | 4/2010 | Kimura | F16L 29/04 |
| | | | 137/614.02 |

FOREIGN PATENT DOCUMENTS

| | | | |
|---|---|---|---|
| EP | 1058044 | B1 | 5/2003 |
| EP | 1566490 | A1 | 8/2005 |
| EP | 1958718 | A1 | 8/2008 |
| EP | 2246608 | A1 | 11/2010 |
| EP | 2803444 | A1 | 11/2014 |
| JP | S57201106 | A | 12/1982 |
| JP | 2002192411 | A | 7/2002 |
| JP | 2003117748 | A | 4/2003 |
| JP | 2009192054 | A | 8/2009 |
| JP | 2009202266 | A | 9/2009 |
| JP | 2010120158 | A | 6/2010 |
| JP | 2017026131 | A | 2/2017 |
| KR | 100812149 | B1 | 3/2008 |
| KR | 20190133108 | A | 12/2019 |
| WO | 2014003695 | A1 | 1/2014 |

OTHER PUBLICATIONS

German Office Action for DE 102020127608.7, filed Oct. 20, 2020. Office Action dated Jul. 15, 2021. pp. 1-5.

International Search Report and Written Opinion for PCT/EP2021/078694, filed Oct. 15, 2021. Search Report dated Apr. 11, 2022. pp. 1-27.

Translated Japanese Office Action, App. No. 2023-518786, mailed Mar. 1, 2025.

Translated JP Office Action, Application No. 2023-518786, dated Oct. 1, 2024, Entire document.

* cited by examiner

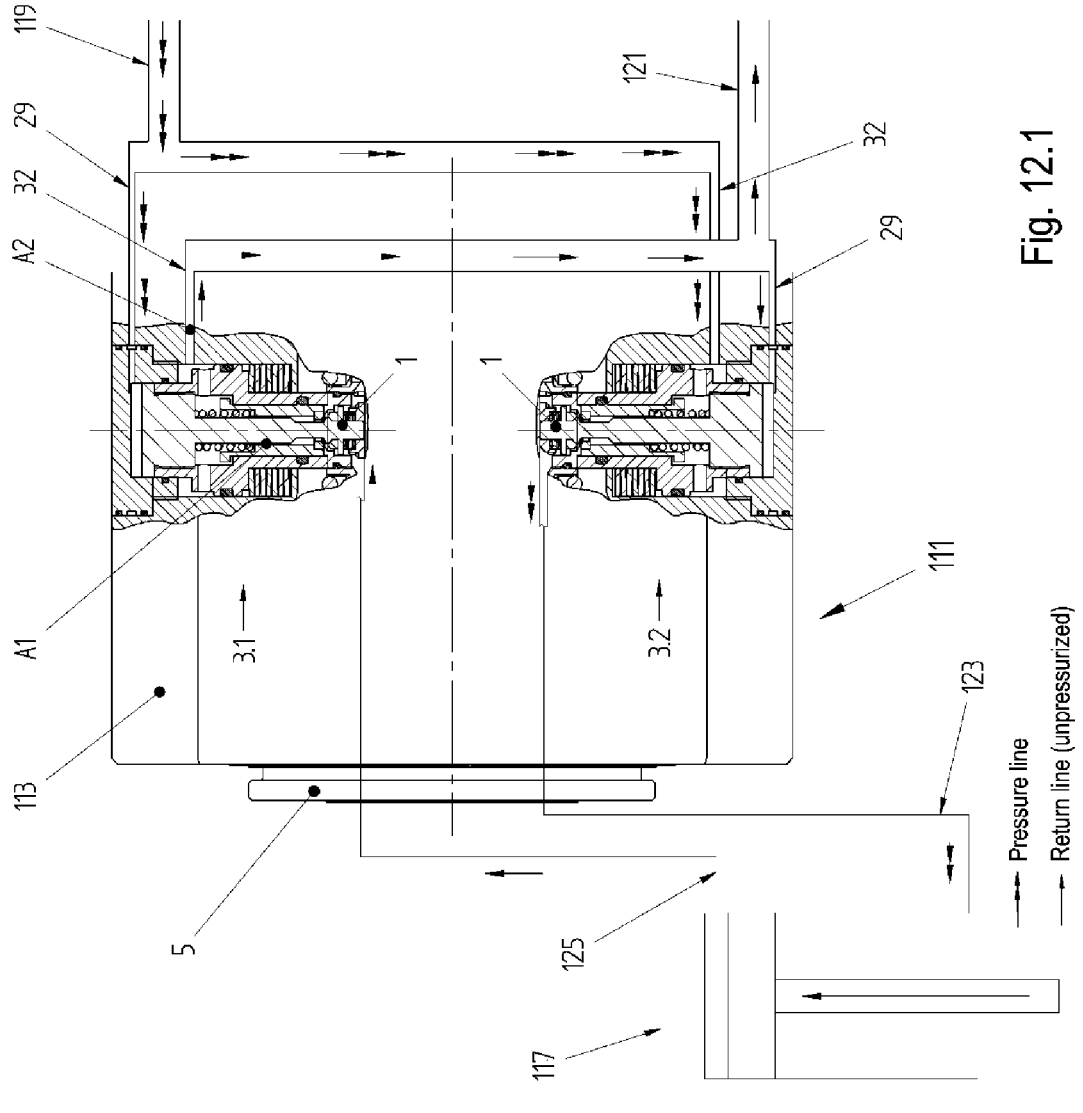
Fig. 12.1

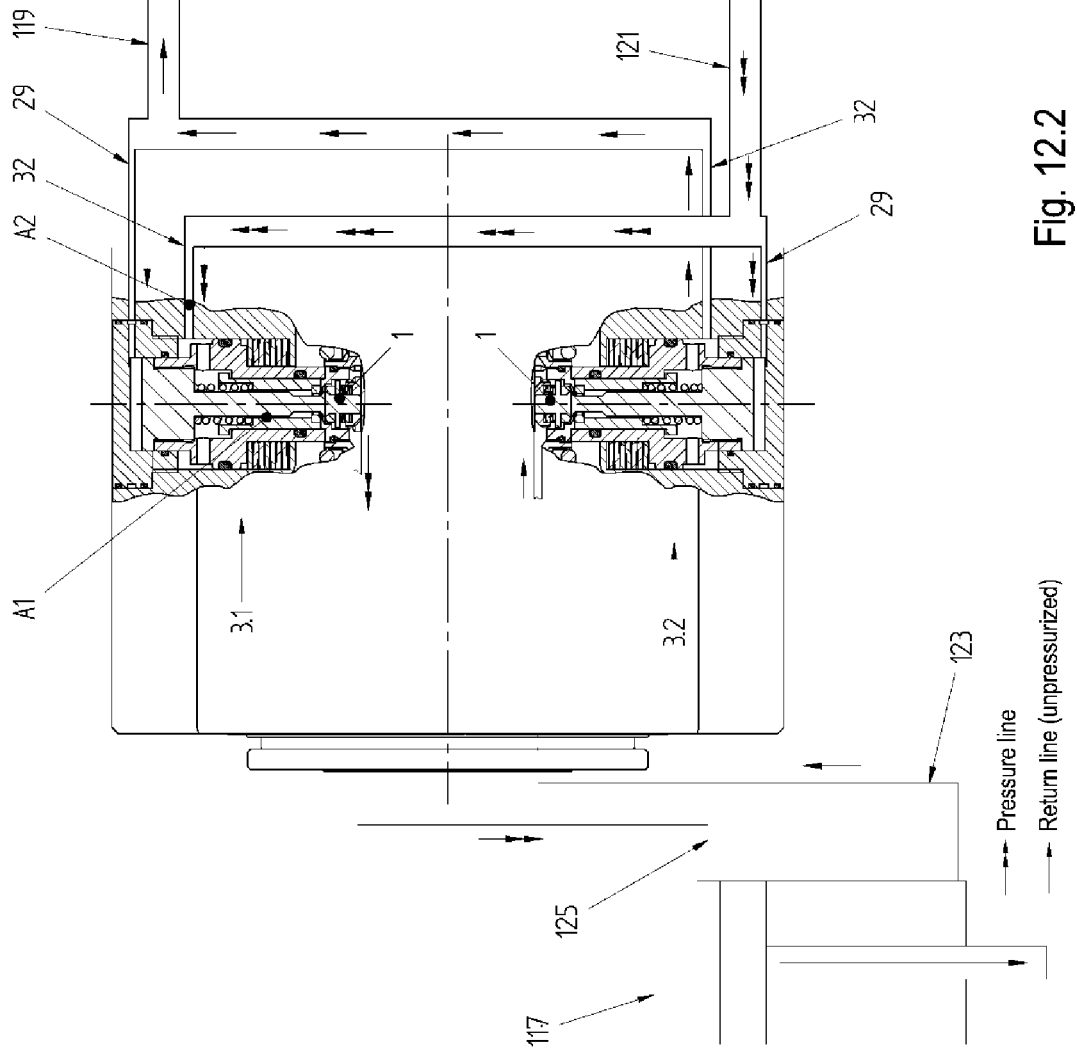
Fig. 12.2

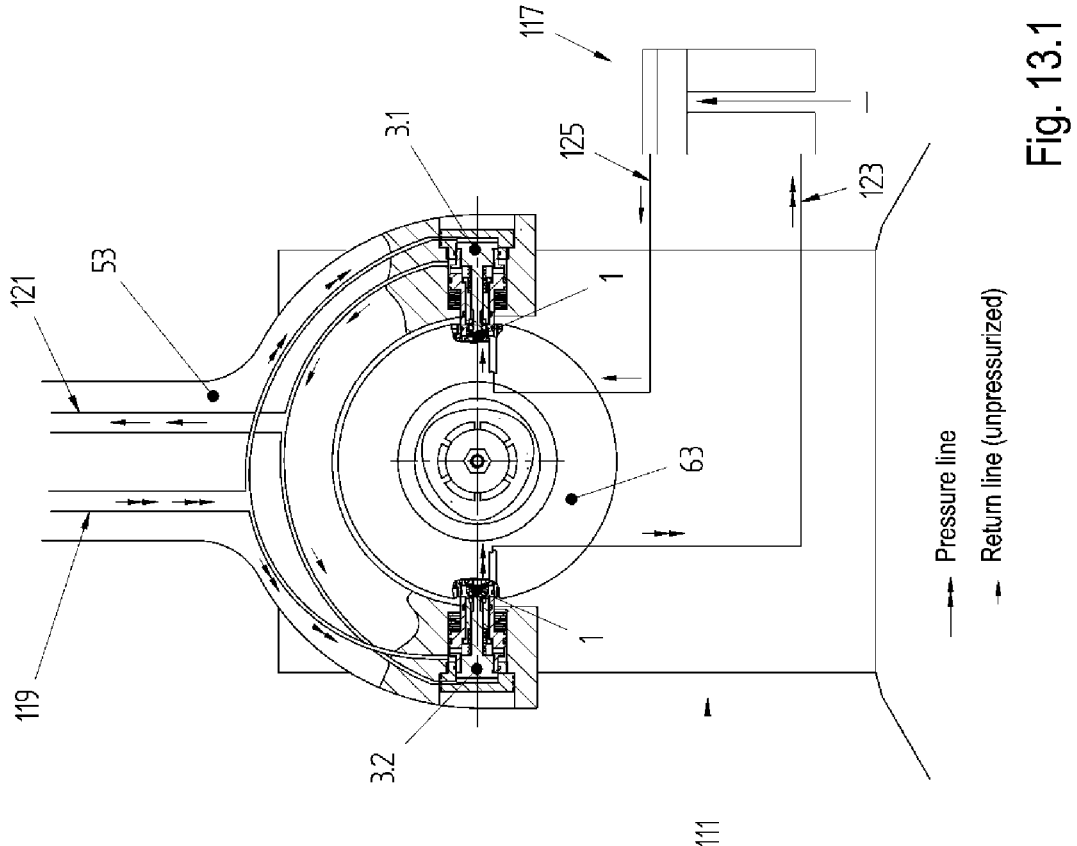
Fig. 13.1
Pressure line
Return line (unpressurized)

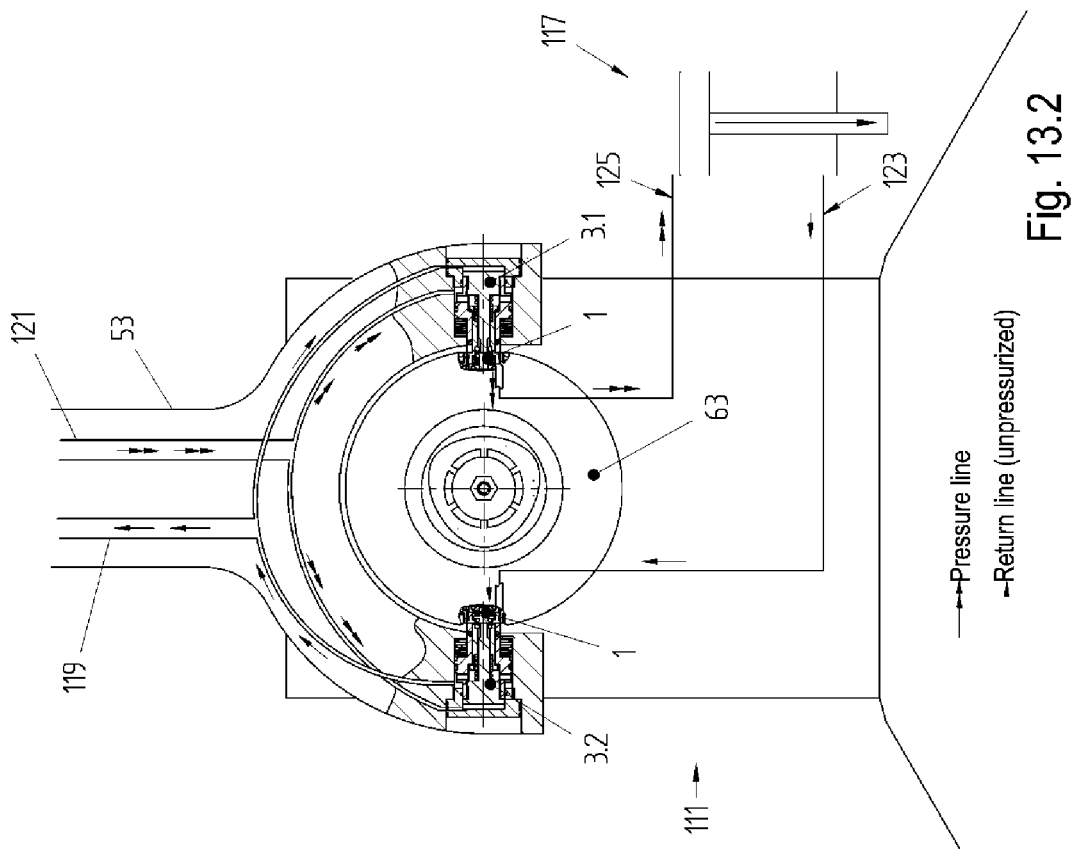
Fig. 13.2
→ Pressure line
→ Return line (unpressurized)

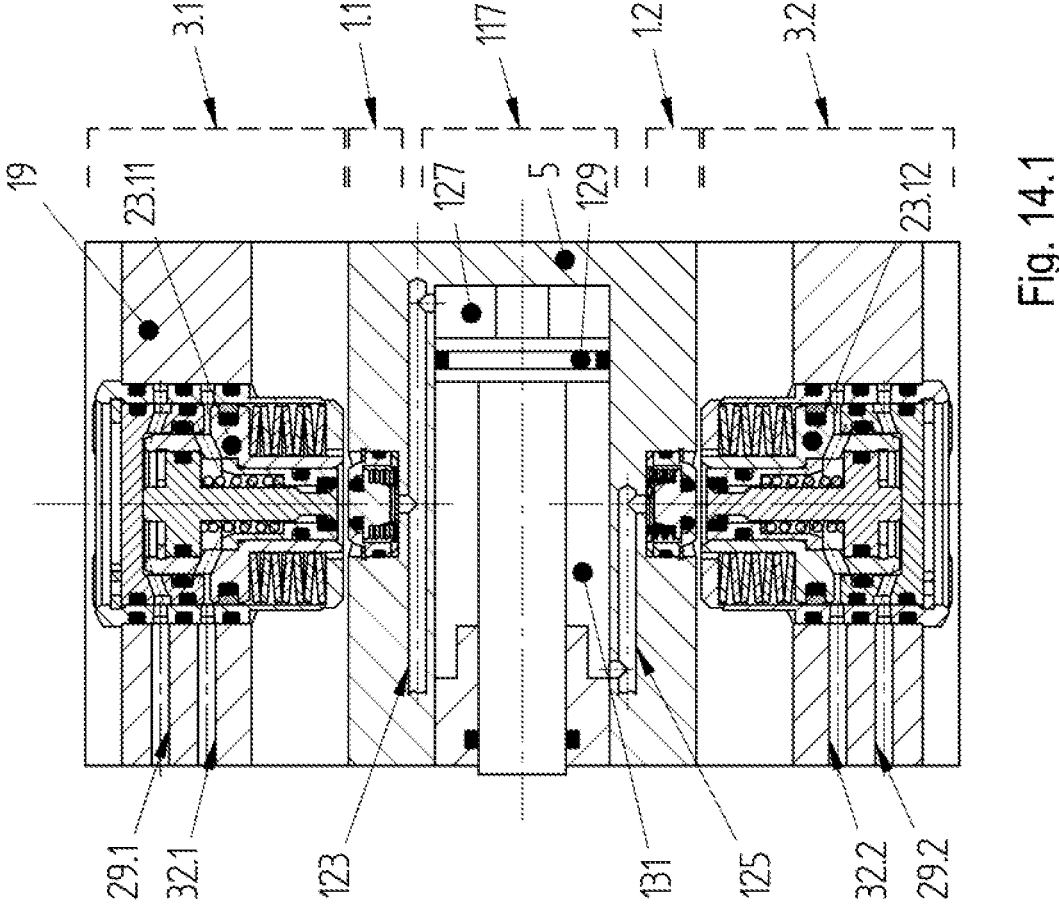
Fig. 14.1

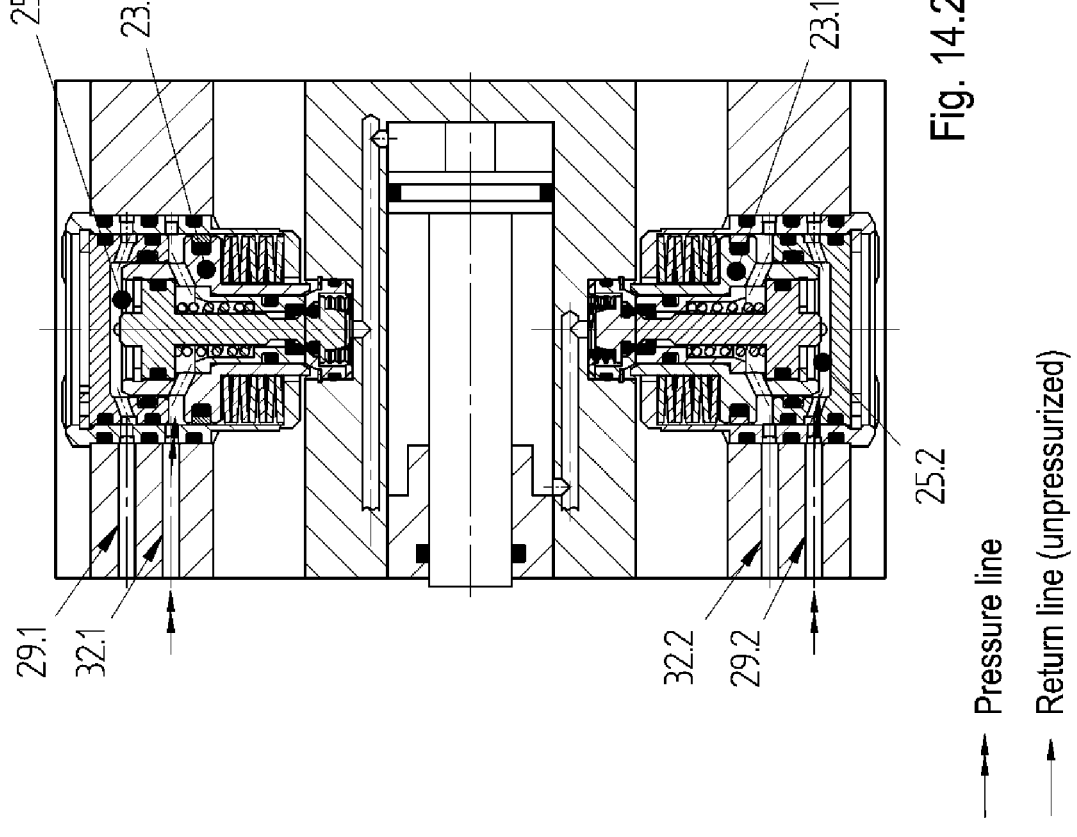
Fig. 14.2
→ Pressure line
→ Return line (unpressurized)

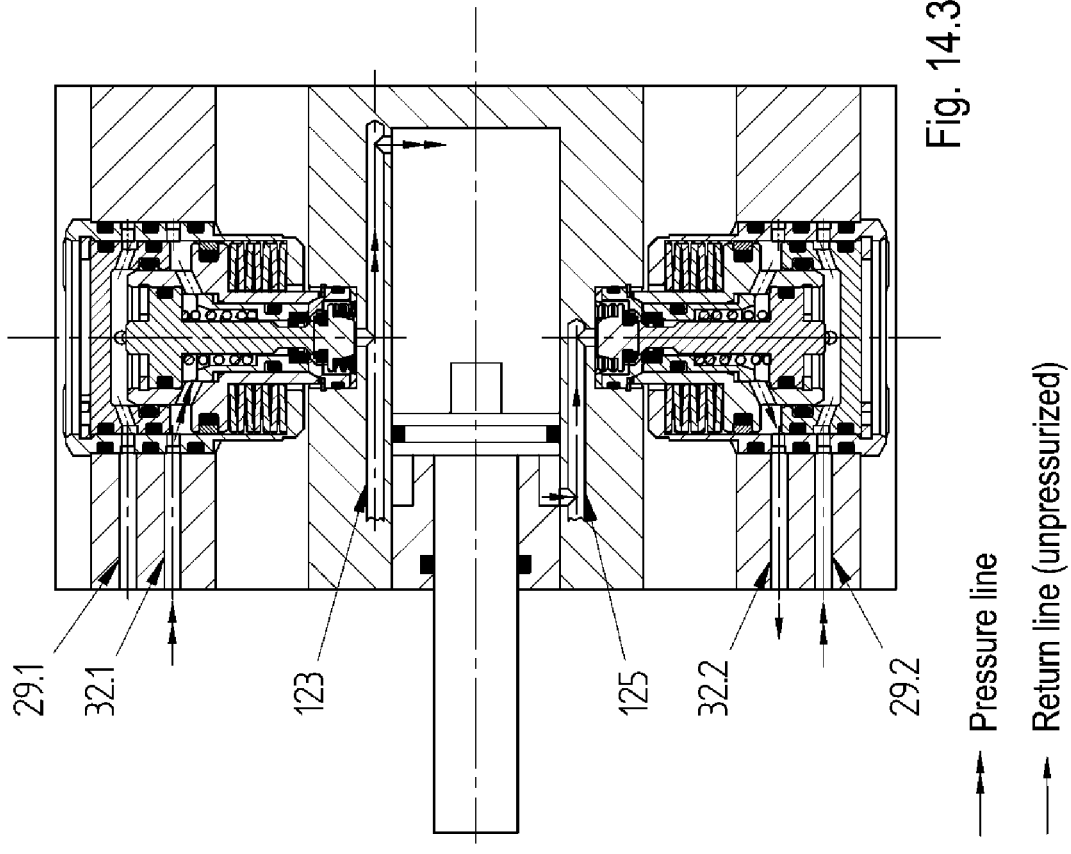
Fig. 14.3
29.1
32.1
123
125
32.2
29.2
↑ Pressure line
→ Return line (unpressurized)

COUPLING DEVICE FOR PRODUCING A NON-PERMANENT HYDRAULIC CONNECTION

CROSS-REFERENCE TO RELATED APPLICATION

The present application is a U.S. National Stage application based on International Application PCT/EP2021/078694, filed Oct. 15, 2021, which claims priority to German Application No. 10 2020 127 608.7, filed Oct. 20, 2020, the entirety of each of which is hereby incorporated by reference.

BACKGROUND

In the field of manufacturing technology, fluidically actuated clamping systems are frequently used in driven or stationary tool holders. The tool holders comprise a (centering) receptacle. An adapter or a tool is inserted into the receptacle. Subsequently, the clamping system is actuated to clamp the adapter or the tool.

In order to be able to clamp the variety of different tools, such as, for example, lathe tools, drill bits, or milling cutters, in the same receptacle, adapters are frequently used. These adapters form the interface for the receptacle and for the clamping system of, for example, a tool holder. For reasons of linguistic simplification, the component which is clamped in a fluidically-actuated clamping device of a tool holder is referred to as an "adapter." This can also be a tool, a tool holder (e.g., drill chuck), or something else.

In the following, the term "fluid" comprises both liquids (e.g., hydraulic fluid) and compressed air. A "fluidic actuation" accordingly comprises both an actuation with liquids (e.g., a hydraulic mechanism) and a pneumatic actuation.

The advantage of a fluidic clamping is the high clamping force with simultaneously relatively small dimensions. In addition, fluidically actuated actuators are highly robust and withstand the rough conditions of use in the manufacturing industry over a long operating time.

Clamping systems exist in which the clamping force is continuously maintained by a compression spring. In order to release the clamping system, the spring force must be overcome, and a tension bolt can be moved from the clamping position into the open position. In this case, a single-acting fluid cylinder, hereinafter also referred to as the "cylinder structure," or shortened as "cylinder," is sufficient. Such a single-acting cylinder has only one fluid connection.

With clamping systems with a self-locking function and without a spring which continuously applies the clamping force, double-acting cylinder(construction)s are required in order to be able to move the tension bolt of the clamping systems both from the open position into the clamping position and from the clamping position into the open position.

In addition, there are clamping systems which are permanently held in the clamping position by a pressurized fluid and/or in which the pressurized fluid serves to secure the clamping position.

In the times between the machining processes, when the tool holder is not in operation, it is possible to exchange adapters, for example to replace worn cutting tools with new cutting tools, or to replace cutting tools used for rotary machining with cutting tools for drilling machining.

It is thus possible in the machining position, when the tool holder is not in operation, and outside the machining position, while at the same time another tool holder with its cutting tool in the machining position carries out a machining process, to exchange the adapter of the tool holder which is not in operation.

In order to be able to carry out the desired movement (clamping or detaching), pressurized fluid must be conveyed into the cylinder. The clamping or detaching of the clamping system takes place at times in which the tool holder is not in operation.

In all cases, the tool holder is situated in the working space of a rotation center or another machine tool.

The supply of the fluid from the pump to the cylinders is particularly complicated, since the feed lines have to pass through all of the axial systems of a machine tool, including the tool holder and—in the case of driven tools, also into the spindle which rotates during operation.

In sum, there is a need for a detachable fluid connection between a fluid supply and the fluid cylinder in the tool holder. This detachable connection is also referred to below as a coupling device.

A coupling system is known from EP 1 058 044 B1. By means of this coupling system, two lines containing a pressurized fluid can be detachably connected to one another and subsequently detached again. This coupling system has proven successful in practice. However, it is very complicated and requires a large amount of installation space in the axial direction.

The reason for this is that the first coupling part (female) has two valves (auxiliary and main control valves) arranged one behind the other.

Additionally, the second coupling part (male) likewise has two valves arranged one behind the other. This sequential arrangement of a total of four valves (two main valves and two auxiliary valves) requires a great deal of installation space; it is complex to manufacture, and therefore not practicable and usable in connection with tool holders.

Further, similar coupling systems are known from JP 2017 26 131 A and US 2010 0 096 032 A1.

In these systems, it is assumed for the perfect function that the two coupling parts are placed on top of one another perpendicularly and centrally, which means without angular or position deviations.

SUMMARY OF THE INVENTION

The object of the invention is to provide a coupling device for pressurized fluids. By means of the coupling device, tool holders which have a fluidically actuated clamping system can be temporarily supplied with a pressurized fluid in a simple, reliable and space-saving manner.

In addition, this detachable coupling device should be easy to actuate between a fluid supply and a tool holder and/or a spindle, and should work in a space-saving manner and function reliably. Furthermore, small angular and position deviations should also be permissible in order, for example, to enable a radial transmission in rotationally symmetrical components, such as, for example, spindles. In addition, the coupling device should reliably seal the interfaces in the uncoupled state and keep the leakage as low as possible.

An automatic tool change (for example with the aid of a handling robot or a robot arm) on a tool holder should also be supported or enabled.

This object is achieved according to the invention, for a coupling device for a fluid, comprising a first coupling part and a second coupling part which works together with the first coupling part, wherein the first coupling part is designed as a spring-loaded and double check valve, wherein the second coupling part comprises an actuator piston guided displaceably in a housing, and wherein an outwardly opening directional valve is arranged in the actuator piston, in that the actuator piston divides a cylinder bore into a first cylinder chamber and a second cylinder chamber, in that the actuator piston has a (spherical/barrel-shaped) cone or an inner dome on its end facing the first coupling part, and in that the first coupling part has a shoulder on its end facing the second coupling part.

The coupling device according to the invention is designed in two parts, as is usual. The first coupling part is most commonly integrated into the component which is to be supplied with fluid. The second coupling part is then provided on the supply side.

To remain in the example: The first coupling part can be arranged in a tool holder or a spindle. The second coupling part can be integrated into a supply bracket which is part of a handling device or a robot hand.

When it is time to change a tool in a tool holder, the robot arm moves the supply bracket into the immediate vicinity of the tool holder—specifically, in such a way that the second coupling part in the power supply bracket and the first coupling part in the tool holder are positioned opposite one another. The spacing between them is a few millimeters. In order to enable a more exact pre-positioning, it is of course possible for additionally positioning stops or pins to be integrated in the supply bracket.

If a spindle (e.g., a driven tool holder) must be supplied with fluid, the second coupling part can alternatively be installed in the housing surrounding the spindle. The fluid supply can then take place from the machine tool into the housing of the driven tool holder, and from there via the second coupling part into the first coupling part of the spindle.

However, it is also expedient to supply the housing of the driven tool holder with fluid via the described supply bracket and at least one first coupling device. From there, the fluid can then pass via fluid connections present inside the housing and at least one second pairing (coupling device) of the second and the first coupling part into the spindle to the clamping system.

With the coupling device according to the invention, both the first coupling part and the second coupling part are very simple in construction and compact in size. The first coupling part is ultimately a double check valve, the valve member of which is accessible from the outside. In a manner according to the invention, the outwardly opening valve tappet of the second coupling part opens "automatically" as soon as the actuator piston of the second coupling part comes into contact with the first coupling part.

The second coupling part according to the invention provides a displaceable actuator piston. The actuator piston can be moved (hydraulically, mechanically or electrically) several millimeters in the direction of the first coupling part. The actuator piston is an independent movement axis of the second coupling part, which allows the coupling device to close and then to open again.

The actuator piston has a directional valve with an outwardly opening valve tappet. The valve tappet of the directional valve is connected or coupled to the actuator piston. The valve seat of the directional valve is displaceable relative to the actuator piston. It could thus be said that the directional valve has an "inwardly opening valve seat." The combination of the actuator piston with the inwardly opening valve seat makes it possible, by moving the actuator piston, to open the directional valve of the second coupling part by a few millimeters and to open the check valve of the first coupling part with the same movement.

As soon as the actuator piston moves back (fluidically or via a spring), the directional valve and the check valve close. The two parts of the coupling device are closed in a fluid-tight manner with respect to one another and to the surroundings. No fluid can escape into the environment or be exchanged between the coupling parts.

Thus, if, for example, the above-mentioned supply bracket has been brought by a robot hand into a position in which the second coupling part (in the supply bracket) is situated directly in front of the first coupling part of the tool holder and the two coupling parts are aligned with one another—but do not yet touch—the actuator piston can move in the direction of the first coupling part.

As soon as the actuator piston comes into contact with the valve housing of the first coupling part, a fluid-tight connection is present between the first coupling part and the second coupling part. Furthermore, the movement of the actuator piston opens the check valve of the first coupling part and the directional valve of the second coupling part.

The check valve is opened by the valve member in the first coupling part being lifted inward off its seat. The directional valve is opened by the valve seat being lifted off a stationary valve tappet.

Only one valve, namely the outwardly opening directional valve, is required on the second coupling part. Due to this very simple construction, the manufacturing costs are relatively low, and above all the installation space requirement is low.

Considering that the second coupling part is part of a handling system, such as for example a robot hand, then only one supply bracket with one (numeral) second coupling part (for example, for actuating a single-acting cylinder) or two (numeral) second coupling parts (for example, for actuating a double-acting cylinders) is/are required for each machine tool.

The supply bracket can also have more than two second coupling parts if the tool holder or the spindle is supplied with further fluids via the supply bracket. For example, by means of an additional second coupling part, compressed air can be provided to verify the flat contact of the adapter with the receptacle, so as to monitor the clamping process, or verify its completion, or to allow cleaning of the contact surfaces.

If necessary, all tool holders situated in the working space of the handling device or the robot hand can be reached. The coupling device according to the invention can be closed, and the clamping system in the tool holder can be opened or clamped as required. When the clamping system is detached, an adapter with a tool to be replaced can be removed from the receptacle of the tool holder, and an adapter with a new tool can be inserted into the receptacle. For example, a blunt tool is replaced, or an adapter with a drill is exchanged for an adapter with a milling cutter. Subsequently, the clamping system is moved into the clamping position, and the tool holder is again ready for use. This can also take place, as already described, while an adjacent tool holder is carrying out a machining operation.

The coupling device according to the invention is of simple design and requires only little installation space.

It should also be mentioned that this coupling device requires no changes or interventions in the machine tool for clamping and detaching a clamping system in a tool holder. An automatic tool change in standard machines/machine tools is thus possible. The retrofitting of an automatic tool change on an existing machine is also possible.

The named advantages are therefore that the supply of the fluidic clamping systems of the tool holders is carried out "outside" of the machine tool, for example by means of a handling robot, which is equipped with a supply bracket according to the invention, with a movement axis which is integrated in the supply bracket and can be controlled independently. An intervention in, or a change to, the machine tool using the tool holders is not necessary. However, the coupling device according to the invention can also be used as a supplement to the fluidic line through the machine, for example from the housing into the spindle of a driven tool.

Due to the (spherical/barrel-shaped) inner cone or the inner dome, the actuator piston centers itself, and also the second coupling part, on the shoulder of the first coupling part. This measure significantly increases the reliability of the coupling device and enables use also under the "rough" conditions in the industry.

With an advantageous development of the invention, a clearance between the cylinder bore and the actuator piston at an end of the actuator piston facing away from the first coupling part is smaller than a clearance between the cylinder bore and the actuator piston at its end facing the first coupling part. As a result, the actuator piston can be somewhat inclined when it is centered with the cone on the shoulder of the first coupling part.

With a preferred embodiment, the fluid chamber of the second coupling part opens into a guide bore, wherein a sleeve-shaped valve seat of the directional valve is accommodated displaceably in the guide bore, and wherein a valve tappet of the directional valve is connected to the actuator piston and projects through the sleeve-shaped valve seat.

In a preferred embodiment, the valve tappet is designed with a valve plate which limits the movement of the movable valve seat (for example in the form of a pressed-in or movable seat ring) in the guide bore of the actuator piston toward the outside.

Optionally, the valve seat can still be relieved via a stop of the valve seat in the actuator piston. This is particularly important if hydraulic pressure is present at the second coupling part, but no first coupling part is provided as a counterpart, for example if the supply bracket is incorrectly positioned.

This means that the seat ring of the valve seat is pressed fluidically by the pressurized fluid in the fluid chamber of the actuator piston against the valve plate of the valve tappet, and seals. The directional valve is closed in this way. Both valves (directional valve and check valve) are only opened when the second coupling part is seated on the first coupling part.

In order to ensure that the valve seat is pressed against the valve plate of the valve tappet under all circumstances, even if the fluid chamber is unpressurized, in an advantageous development, a second compression spring is arranged in the fluid chamber, which presses the seat ring of the valve seat against the valve plate of the valve tappet.

The object mentioned at the outset is also achieved, for a coupling device for a fluid, comprising a first coupling part and a second coupling part which work together with the first coupling part, wherein the first coupling part is designed as a spring-loaded, double check valve, wherein the second coupling part comprises an actuator piston which is guided displaceably in a housing, wherein an outwardly opening directional valve is arranged in the actuator piston, in that the actuator piston is designed as a stepped piston, in that a first part of the actuator piston delimits the first cylinder chamber, and in that a second part of the actuator piston delimits a third cylinder chamber, and in that a diameter $D23.1$ of the first part is smaller than a diameter $D23.2$ of the second part of the actuator piston, such that an annular surface is produced in the third cylinder chamber.

In a further advantageous development, a first seal is provided on an end of the actuator piston facing away from the first coupling part, and a second seal is provided on the end of the actuator piston facing the first coupling part, wherein the second seal is flexible in the radial direction such that it seals the second cylinder chamber even when the actuator piston is tilted or offset relative to the cylinder bore. This ensures that the second coupling part is well sealed even under unfavorable conditions (tilted actuator piston).

In an advantageous embodiment of the invention, a fluid chamber is formed in the actuator piston, wherein the fluid chamber is closed on one end, and the fluid chamber is fluidically connected to a fluid supply via a supply line, for example in a housing of a supply bracket, via a circumferential groove present on the outside of the actuator and at least one radial bore. Via the supply line, the fluid (e.g., hydraulic oil) can be provided by a fluid assembly at the desired pressure.

In order to be able to move the actuator piston in a targeted manner back and forth in the cylinder bore of the housing, it is provided that the actuator piston divides the cylinder into a first cylinder chamber and a second cylinder chamber, and that the first cylinder chamber can be supplied with fluid via a controllable first control line and the second cylinder chamber can be supplied with fluid via a controllable second control line.

The actuator piston moves back and forth in the cylinder bore as a function of which of the control lines carries pressurized fluid. As a result, it is possible, by actuating one of the control lines, for example, to move the actuator piston, and with it the directional valve, in the direction of the first coupling part. The actuator piston is thus moved in a targeted manner—and without moving the robot hand. As a result, the distance between the first and second coupling part that is present before the start of the coupling process can be eliminated, and a fluidic connection between the first and second coupling parts can be produced.

Due to the actuator piston, which accommodates the fluid chamber, the second compression spring, and also the outwardly opening directional valve according to the invention, a very compact, and especially very short, design is achieved. The actuator piston and the directional valve according to the invention are also easy to manage in terms of production processes, such that they can be made available at relatively low costs and with a long service life.

A sleeve-shaped valve seat is guided in the actuator piston. A valve tappet of the directional valve, which is coupled to the actuator piston, projects through this valve seat. A valve plate of the valve tappet delimits the path of the valve seat in the guide bore.

It is particularly advantageous if the valve seat comprises a sleeve and a seat ring accommodated and guided in the sleeve, along with a spring element. The spring element is supported at one end against the sleeve and at the other end against the seat ring. As a result, an angular offset between the first coupling part and the second coupling part can be compensated for without impairing the function of the coupling device. This angle compensation according to the invention expands the area of use to applications in which the first coupling element is arranged in a rotatably mounted spindle. Errors frequently occurring in practice when positioning the spindle can thereby be compensated for.

In the case of the coupling device, a second compression spring can be arranged in the fluid chamber, wherein a spring force exerted on the valve seat by the second compression spring compels the valve seat against a defined stop or, if the spring element has a higher spring force than the second compression spring, against the valve plate of the valve tappet.

In an advantageous embodiment of the coupling device according to the invention, the check valve of the first coupling part comprises a valve housing, wherein an opening for the fluid, which opening is connected to the check valve, is formed on the valve housing, wherein the opening opens into a shoulder of the valve housing, and wherein, when the coupling device is closed, the shoulder dips into the guide bore of the second coupling part.

As a result of this very simple and robust solution, the shoulder of the first coupling part brings about an opening of the directional valve in the second coupling part as soon as the actuator piston of the second coupling part moves together with the outwardly opening directional valve in the contact direction of the first coupling part or its shoulder.

At the same time, the valve tappet of the second coupling part presses against the valve member and the first compression spring of the first coupling part, and exposes the opening of the check valve because the sealing ring lifts off the valve housing.

Alternatively, the valve housing and the end face of the actuator piston can be designed as a centering cone pair (male/female; female/male).

Of course, other centering pairings such as dome-shaped pairings or a combination of cone and dome-shaped or spherical conical contours are also possible.

In an advantageous development, the fluid chamber is fluidically connected and is supplied with fluid at least in the open position of the directional valve via a circumferential groove which is present on the outside of the actuator piston and at least one radial bore to a supply line in the housing. The "open position of the directional valve" means that the valve plate does not rest on the valve seat.

Optionally, the first cylinder chamber can be supplied with fluid via a first control line. The second cylinder chamber can (likewise optionally) be supplied with fluid via a second control line.

In a particularly advantageous embodiment of the second coupling part, a third compression spring is arranged in the second cylinder chamber or outside the housing, the spring force of which, acting on the actuator piston, counteracts the force of a fluid in the first cylinder chamber.

The fluid chamber can be supplied with fluid via a supply line or a combined control and supply line. Preferably, the third cylinder chamber and the fluid chamber are simultaneously supplied with fluid via the control and supply line. This allows a very compact design and reduces the manufacturing effort. In an advantageous development, the coupling device according to the invention has a throttle or a diaphragm between the fluid chamber and the directional valve. As a result, when the directional valve is open, the outflow of pressurized fluid is limited from the fluid chamber, such that in the fluid chamber and in the third cylinder chamber, a certain minimum overpressure is maintained. As a result, the actuator piston remains in its open position.

The throttle can be designed as an annular gap between the valve tappet and the valve seat or its sleeve.

Space is always limited in the machining space of a machining operation. However, the second coupling part requires a certain amount of space to provide the required actuating force at a specified fluid pressure. A development according to the invention, in which at least the second portion of the actuator piston has an oval or elliptical cross-section, and in which at least the second portion of the cylinder bore has an oval or elliptical cross-section, offers a way out of this dilemma. Then, with the same area of the second portion of the actuator piston, the overall length of the second coupling part in one direction is reduced. This reduction makes it possible in some applications to use the coupling device according to the invention even under restricted conditions.

Advantageous designs of the first coupling part relate to the check valve thereof. It comprises a valve housing, wherein an opening is formed on the valve housing for the fluid, which opening is hydraulically connected to the check valve, wherein the opening is formed in the shoulder of the valve housing, wherein, when the coupling device is closed, the shoulder dips into the guide bore of the second coupling part, and the valve seat of the directional valve lifts off from the valve plate of the valve tappet, and wherein a line in the housing or a spindle is opened or closed by the check valve.

The centering between the first and second coupling part is further improved if the shoulder of the valve housing is designed to be frustoconical or dome-shaped.

The coupling device according to the invention can be used in various constellations. It is preferred if the second coupling part is arranged in a supply bracket. The supply bracket then comprises a housing with a cylinder bore which receives the actuator piston.

If the clamping system in a tool holder provides a double-acting fluid cylinder, then two first coupling parts are integrated in the tool holder. The supply bracket then also has two second coupling parts. The second coupling parts are then arranged such that a second coupling part and a first coupling part are positioned opposite each other without changing the position of the supply bracket. Depending on whether the clamping system will be opened or closed, one of the couplings serves as a fluid supply and the other as a fluid outlet, or vice versa.

If the clamping system in a tool holder provides a single acting fluid cylinder, only one first coupling part is integrated in the tool holder. The supply bracket then also requires only one second coupling part.

However, it is also possible for a supply bracket according to the invention that is equipped with two or more second coupling parts to work together with only one first coupling part. A second coupling part of the supply bracket is then positioned at a small distance in front of the first coupling part of the tool holder. The coupling device is closed by a targeted actuation of the actuator piston belonging to this second coupling part.

The invention can be used in a stationary tool holder comprising a housing and at least one centering receptacle arranged in the housing for receiving an adapter, and a fluidically actuated clamping system for clamping and detaching the adapter in the centering receptacle. To do this, a first coupling part is present on the housing, and the first coupling part interacts with a second coupling part in a supply bracket.

In a corresponding manner, the coupling according to the invention can also be used in a driven tool holder comprising a housing, a spindle mounted in the housing, at least one centering receptacle arranged in the spindle for an adapter, and a fluidically actuated clamping system for clamping and detaching the adapter in the centering receptacle.

In a preferred embodiment, provision is made for at least one first coupling part to be provided in the spindle, preferably in a collar of the spindle.

In a further preferred embodiment, it is provided that at least one of the second coupling parts is installed in the housing surrounding the spindle and is supplied with fluid via the housing and the adjoining components (such as, for example, components of the machine tool or the handling system).

In order to minimize the mechanical load of the spindle by the actuator piston approaching the valve housing or the valve tappet approaching the valve member, it is advantageous that, especially in the case of double-acting fluidic clamping systems, the two first coupling parts are arranged opposite one another in the spindle, and are thus offset by 180°. If the second coupling parts then simultaneously approach the two first coupling parts of the spindle, then the forces acting radially on the spindle cancel each other out, and the bearings of the spindle are only subjected to a very small load. In addition, deflection of the spindle due to radially acting forces is prevented. If more than two coupling systems are used, the arrangement of the spindle and its exposure to actuator forces acting thereon is selected such that the resulting forces largely cancel each other out.

In a particularly advantageous embodiment of the supply bracket comprising two second coupling parts, these second coupling parts (denoted below as number 1 and number 2) are connected crosswise to the fluid lines of the supply bracket. Crosswise means, for example in the case of a second coupling part which is connected to a control line and a combined control and supply line, the control line of the second coupling part number 1 and the combined control and supply line of the second coupling part number 2 are connected to the same fluid line, and that the combined control and supply line of the second coupling part number 1 and the control line of the second coupling part number 2 are connected to the same fluid line. The extension of the actuator piston can take place via two hydraulically separated pistons of the actuator piston, one of these pistons being connected to the fluid chamber. The return into the non-connected position of the actuator piston can take place via a spring.

By means of this "crosswise" connection configuration, it is possible with two fluid lines to actuate the cylinder structure of a tool holder in such a way that the piston, and with it the piston rod, moves in both directions, that, due to the movement of the piston, the fluid displaced in the cylinder structure is discharged, and to compensate for the change in volume of the first cylinder chamber or of the third cylinder chamber in one of the two second coupling parts.

BRIEF DESCRIPTION OF THE DRAWINGS

Further advantages and advantageous embodiments of the invention can be found in the following drawings, the descriptions and the claims. All the features disclosed in the drawings, the descriptions thereof and the claims can be essential to the invention both individually and in any combination.

In the drawings:

FIGS. 12.1 and 12.2 show the integration of the second exemplary embodiment in a tool holder, and the connection configuration thereof in two views; and FIGS. 13.1 and 13.2 show the integration of the second exemplary embodiment in a supply bracket and the connection configuration thereof in two views.

FIGS. 14.1 to 14.3 show the transfer according to the invention of fluid into the cylinder structure of a tool holder.

DESCRIPTION OF THE EXEMPLARY EMBODIMENTS

Figure 1:
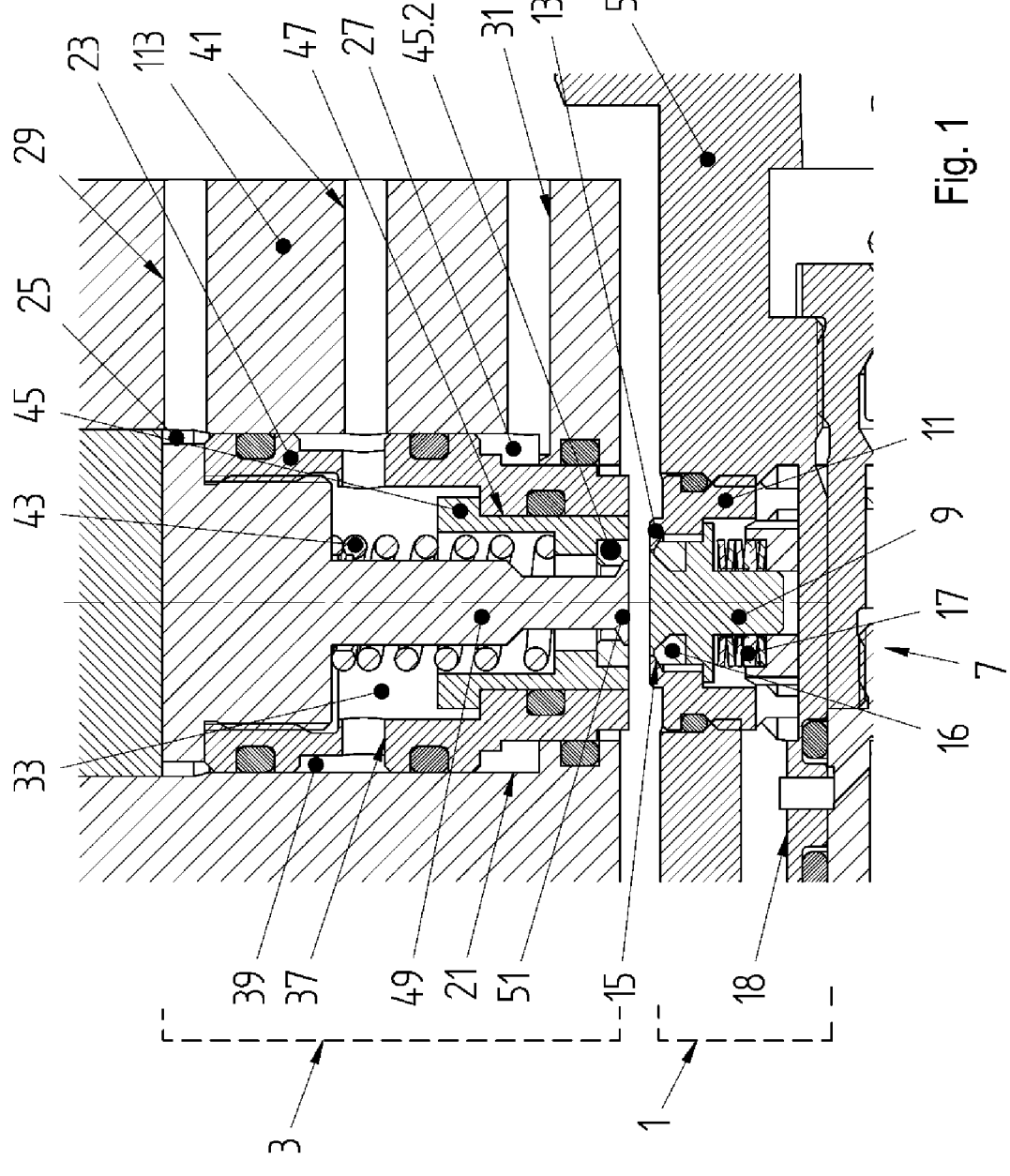
FIG. 1 shows a section through an embodiment of a coupling device according to the invention in the open state.

FIG. 1 shows a coupling device according to the invention in the open state. The coupling device comprises a first coupling part 1 and a second coupling part 3. The first coupling part 1 is shown in the lower part of FIG. 1, and the second coupling part 3 is shown in the upper part of FIG. 1. As already explained several times in the introduction to the description, the coupling device according to the invention can be used in many different constellations.

Figure 5:
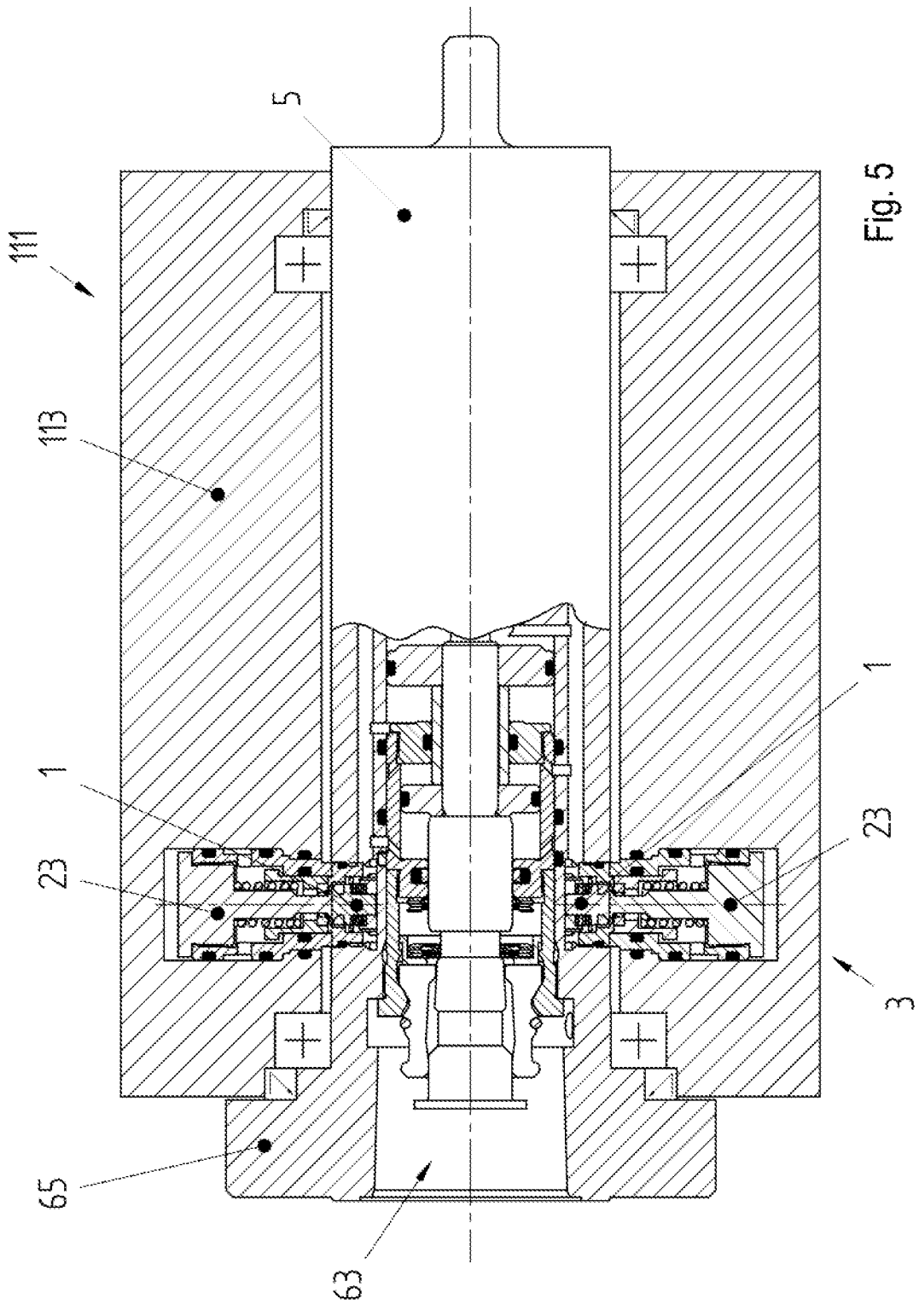
FIG. 5 shows a section through a driven tool holder and an installed spindle with two coupling devices.

In FIG. 1, the first coupling part 1 is integrated in a spindle 5 of a tool holder, as shown in more detail in FIG. 5. FIG. 1 shows only a small section of the spindle 5 in order to be able to clearly recognize the structural features of the first coupling part 1 and of the second coupling part 3.

The first coupling part 1 comprises a check valve 7, the valve member 9 of which is held and guided in a valve housing 11. The valve housing 11 is screwed into the spindle 5 by means of a thread. Alternatively, the check valve 7 can also be connected with a press-fit, or snapped-in.

A shoulder 13 with an opening 15, which is closed in this state, is formed on the upper end of the valve housing 11 in FIG. 1. With this exemplary embodiment, a sealing ring 16 is arranged on the valve member 9, and works together with a conical valve seat (without reference numeral) of the valve housing 11. The valve member 9 is pressed against the valve seat by a first compression spring 17 designed as a disk spring assembly, such that the check valve 7 is closed in the position shown in FIG. 1.

The upper part of FIG. 1 shows the second coupling part 3. For example, it is integrated into a housing 113 of a tool holder 111. A cylinder bore 21 is present in the housing 113. An actuator piston 23 is guided in a manner providing both movement and a seal in the cylinder bore 21.

The actuator piston 23 divides the cylinder bore 21 into a first cylinder chamber 25 and a second cylinder chamber 27. A first control line 29 opens into the first cylinder chamber 25. If fluid under pressure is present in this first control line 29, the volume of the first cylinder chamber 25 increases and the actuator piston 23 moves downward in FIG. 1 until it rests on the planar surface (without reference signs) of the first coupling part 1 or—if this first coupling part 1 is not present as a coupling partner (e.g., because the spindle 5 is in an incorrect rotational position)—it rests on a shoulder (without reference numeral) of the cylinder bore 21. Then it has reached its lower end position. In this case, fluid is discharged from the second cylinder chamber 27 via the second control line 31.

In order to bring the actuator piston 23 from the lower end position back into the upper end position shown in FIG. 1, pressurized fluid is guided in a corresponding manner via the second control line 31 into the second cylinder chamber 27. At the same time, fluid is discharged from the first cylinder chamber 25 via the first control line 29.

A fluid chamber 33 is formed in the interior of the actuator piston 23. This fluid chamber 33 is closed in itself. The fluid chamber 33 can be supplied with fluid only via radial bores 37 and a circumferential groove 39 arranged on the outside of the actuator piston 23. With this exemplary embodiment, the circumferential groove 39 is positioned and dimensioned such that, irrespective of the position of the actuator piston 23 in the cylinder bore 21, there is always a fluid connection between a supply line 41 in the housing 19 and the circumferential groove 39. However, it is sufficient and even particularly advantageous if this fluid connection exists only when the actuator piston 23 is in the lower end position (in FIG. 2). Specifically, the coupling device is then closed.

A second compression spring 43 is clamped in the fluid chamber 33 and presses a sleeve-shaped valve seat 45 in the direction of the first coupling part 1 or in the direction of the valve plate 51 of the valve tappet 49 (downward in FIG. 1).

The sleeve-shaped valve seat 45 is guided in a manner allowing movement and providing a seal in a guide bore 47 in the actuator piston 23. Like the valve seat of the check valve 7, it has a seat ring 45.2, preferably made of plastic or rubber.

A valve tappet 49 of the directional valve is fixedly connected to the actuator piston 23. The valve tappet 49 has a relatively long and thin cylindrical shaft at the lower end of which the already mentioned valve plate 51 is formed.

In the position shown in FIG. 1, the valve seat 45 is in its closed position, i.e., the second compression spring 43 presses the valve seat 45 with the seat ring 45.2 against the valve plate 51 of the valve tappet 49. In this position of the valve seat 45, no fluid can flow from the supply line 41 through the fluid chamber 33 in the direction of the first coupling part 1. The directional valve in the actuator piston 23 is closed.

Figure 2:
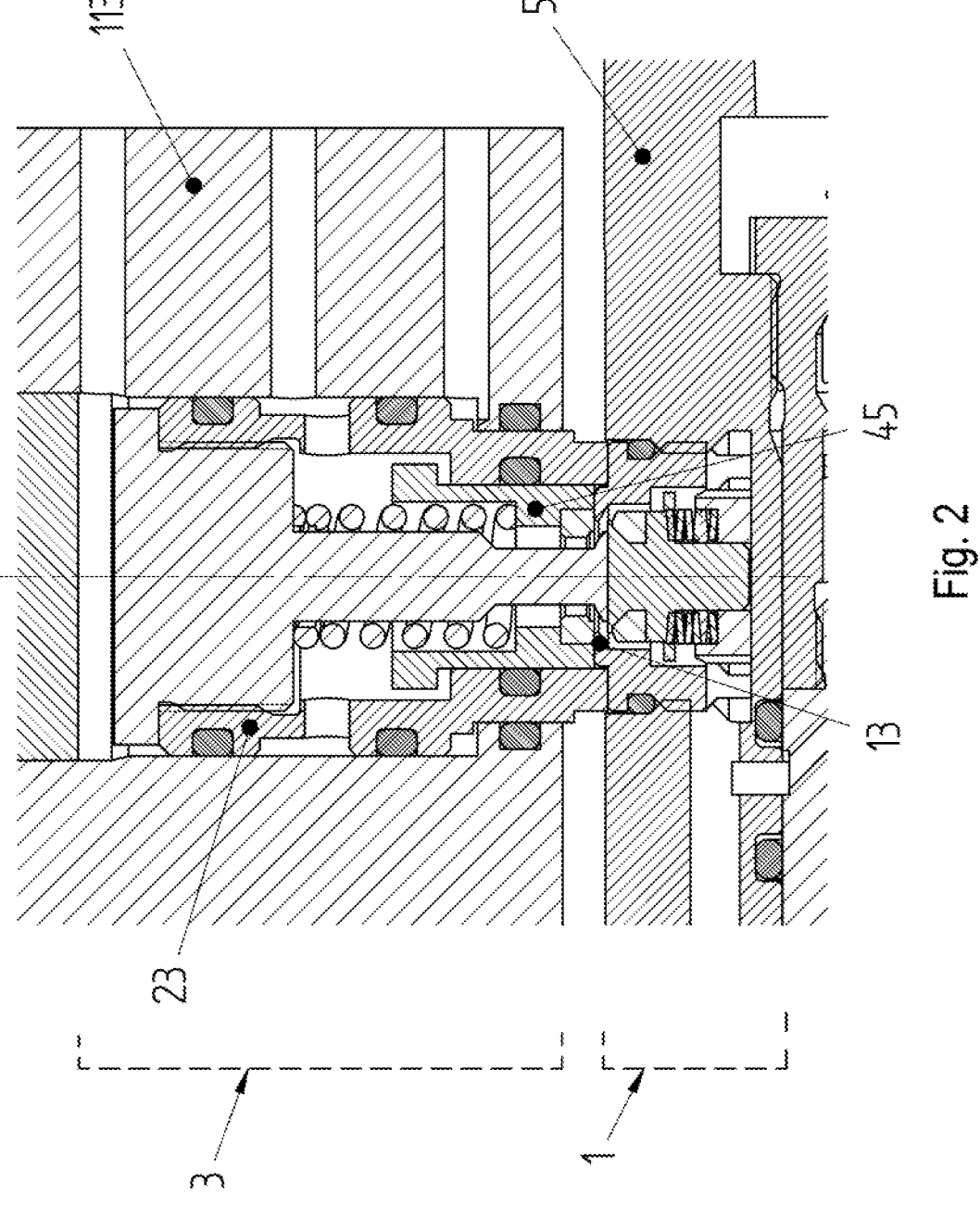
FIG. 2 shows the same coupling device in the closed state.

If at this point the first cylinder chamber 25 is supplied with pressurized fluid via the first control line 29, the actuator piston 23 moves downward in FIG. 1, as is shown in FIG. 2. For reasons of clarity, only a few reference signs are shown in FIG. 2.

It can be seen that the valve tappet 49 is entrained by the movement of the actuator piston 23, because it is connected to the actuator piston 23. As soon as the actuator piston 23 has moved slightly downward, the valve seat 45 comes into contact with the shoulder 13 of the first coupling part 1.

The valve seat 45 cannot follow the movement of the actuator piston 23 further, because of the shoulder 13. The second compression spring 43 is compressed and the valve seat 45 lifts off from the valve plate 51 of the valve tappet 49. As a result, the directional valve in the second coupling part 3 is opened.

At the same time, however, the valve tappet 49 of the directional valve ensures that the check valve 7 in the first coupling part 1 is also opened. This is done by the valve tappet 49 of the second coupling part 3 connected to the actuator piston 23 pressing the movable valve member 9 of the check valve 7 downwards in the first coupling part 1 against the force of the first compression spring 17 (in FIG. 2), and thus opening it.

A fluid connection is thus produced between the first coupling part 1 and the second coupling part 3.

As can be clearly seen from FIG. 2, only a minimal leakage volume is present between the shoulder 13 of the first coupling part 1 and the guide bore 47 in the actuator piston 23. The potential resulting leakage rate is very low.

If the coupling device is to be opened again, pressurized fluid is applied to the second control line 31. As a result, the actuator piston 23 moves upward in the cylinder bore 21. With it, the valve tappet 49 of the second coupling part 3 also moves upward. As a result, the valve member 9 of the check valve 7 is moved upward by the first compression spring 17 against the valve seat, and is thus closed.

In a corresponding manner, the valve seat 45 of the second coupling part 3 also moves relative to the actuator piston 23 (downward in FIGS. 1 and 2) and closes the directional valve in the second coupling part 3.

FIGS. 1 and 2 illustrate the function of the actuator piston 23 as an independent movement axis for closing and opening the coupling device according to the invention. The actuator piston 23 can also be actuated electrically, magnetically or electromechanically. Various configurations are shown below with reference to FIGS. 3 to 5 in order to explain the various ways in which the coupling device according to the invention can be used.

Figure 3:
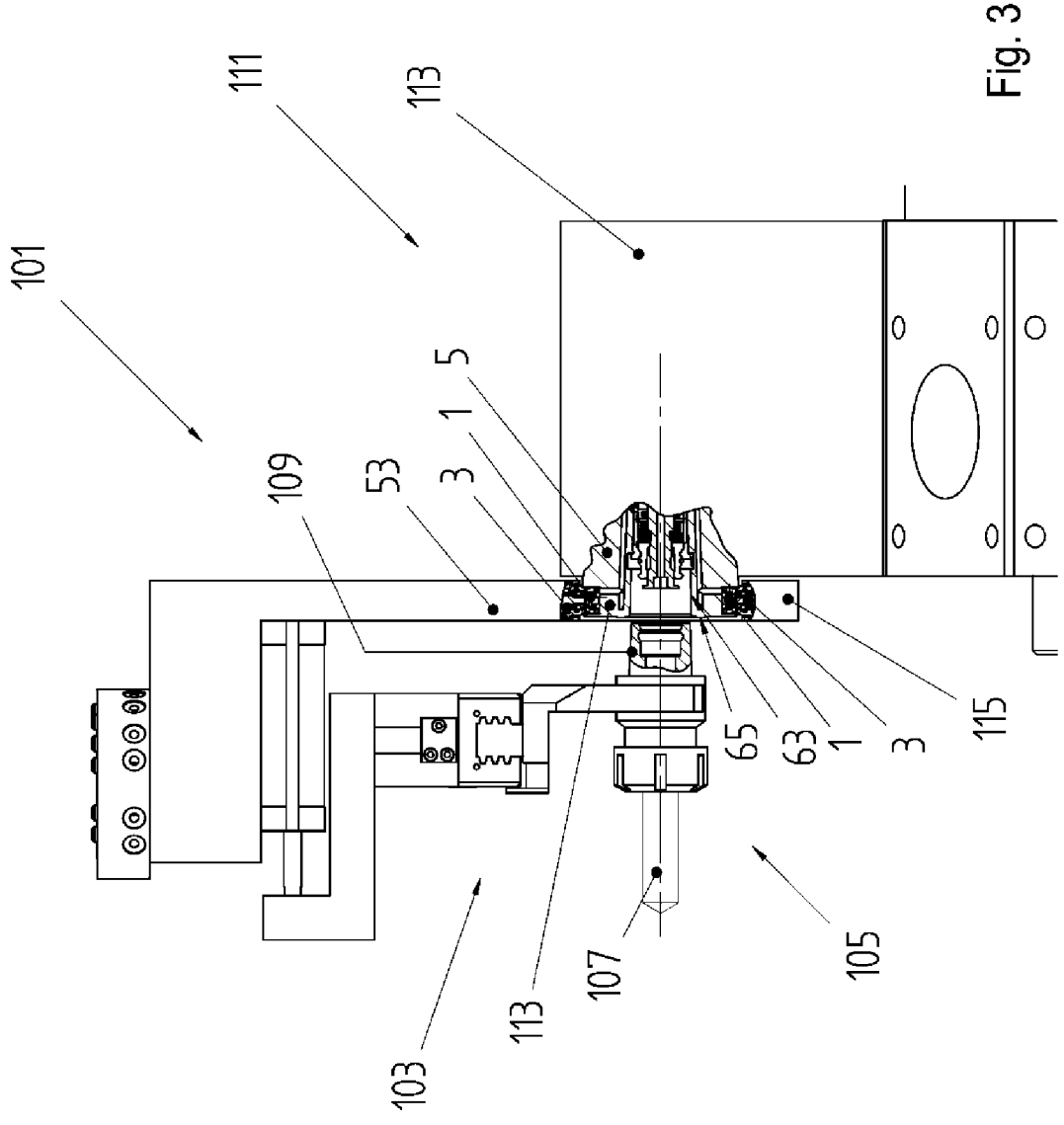
FIG. 3 shows a tool holder and a robot hand which is equipped inter alia with a supply bracket according to the invention.

FIG. 3 shows a robot hand 101 which can be attached to an industrial robot (not shown). This robot hand 101 comprises a plurality of assemblies; of these, the supply bracket 53 according to the invention is of particular interest.

A movable gripper 103 is attached to the robot hand 101, which in FIG. 3 holds an adapter 105 with a cutting tool 107 (shown here as a drill) and a hollow shaft 109. This adapter 105 is shown only by way of example. The invention is not limited to this type of adapter 105.

The gripper 103 serves to insert the adapter 105 into a centering receptacle 63 of a tool holder 111 (shown in a cutaway view), or to remove it when necessary. The fluid connection between the supply bracket 53 and the tool holder 111 does not have to be detached for this purpose.

If it is a driven tool holder 111, the centering receptacle 63 is situated in a rotatably mounted spindle 5 (see FIGS. 4 and 5). In the case of a stationary tool holder, the centering receptacle 63 is situated in a housing 113 of the tool holder 111.

So that the gripper 103 can insert the adapter 105 into the centering receptacle 63 or can be removed if necessary, the fluid-actuated clamping system must be actuated in the spindle 5 of the tool holder 111. The clamping system shown in FIG. 3 comprises a plurality of clamping segments, which are arranged around a tension bolt. By moving the tension bolt in the axial direction relative to the spindle 5, the clamping system is opened and clamped. The movements of the tension bolt, and also the actuating force required for clamping the clamping system, are provided by the above-mentioned fluid-actuated, single or double-acting cylinder structures.

The supply of the clamping system or of the cylinder structure with pressurized fluid (and optionally also the removal of fluid from a pressure chamber of the cylinder structure) occurs by means of the supply bracket 53 according to the invention.

In FIG. 3, the docking portion 115 of the supply bracket 53 and the spindle 5 are shown partially cutaway, such that two second coupling parts 3 and two first coupling parts 1 are visible.

Without going into the structural details of the spindle 5, it should be pointed out only that the spindle 5 with this exemplary embodiment has a collar 65 on its front end. Two first coupling parts 1 are arranged opposite one another in the collar 65.

Figure 4A:
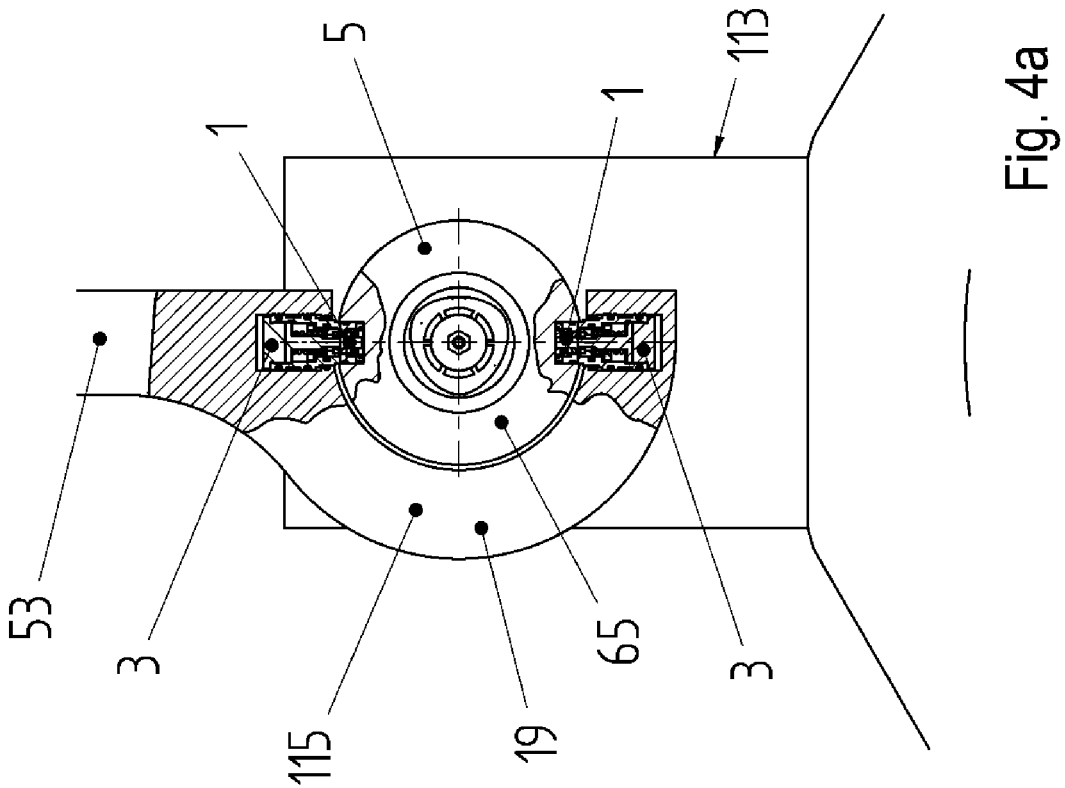
FIGS. 4*a* and 4*b* show views from the front of the centering receptacle of the tool holder according to FIG. 3.
Figure 4B:
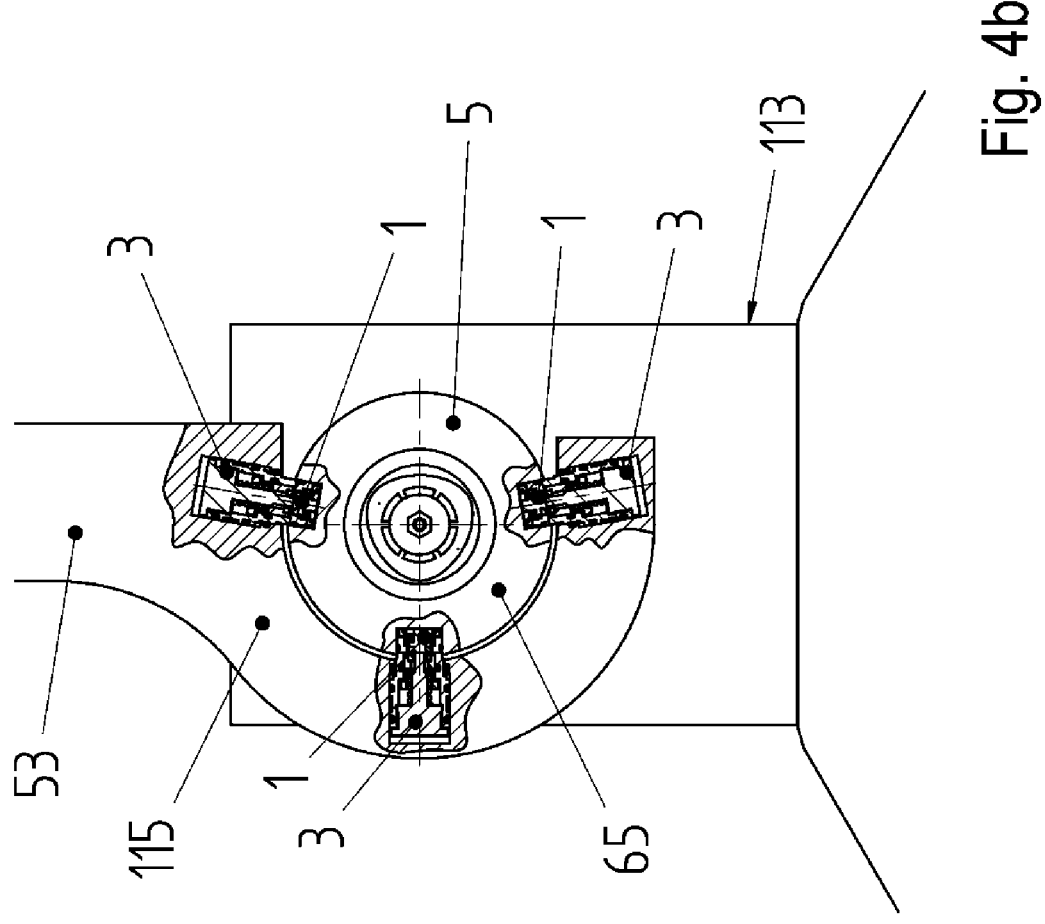

FIGS. 4a and 4b show two variants of the supply bracket 53 in a side view. The supply bracket 53 according to FIG. 4a comprises an approximately semicircular or C-shaped docking portion 115 with two second coupling parts 3.

The supply bracket 53 according to FIG. 4b comprises an approximately semicircular or C-shaped docking portion 115 with three second coupling parts 3.

Accordingly, two or three first coupling parts 1 are provided in the spindle 5 and/or the housing 113 of a stationary tool holder 111.

FIGS. 4a and 4b show the same situation as in FIG. 3, but from a different viewing direction toward the spindle 5 with its centering receptacle 63 and the docking portion 115 of the supply bracket 53.

It can be clearly seen in FIGS. 4a and 4b that the docking portion 115 surrounds the collar 65, and a second coupling part 3 in the docking portion 115 is arranged opposite each first coupling part 1 in the collar 65.

If the two (FIG. 4a) or three (FIG. 4b) coupling devices are open, the actuator pistons 23 of the second coupling parts 3 are situated in the position shown in FIG. 1.

If the two (FIG. 4a) or three (FIG. 4b) coupling devices are closed, the actuator pistons 23 of the second coupling parts 3 are situated in the position shown in FIG. 2.

By actuating one or more of the actuator pistons 23 in a targeted manner, one or more of the coupling devices can be closed or opened independently of the others. This is done by the targeted and individual actuation of the actuator pistons 23 of the second coupling parts 3. The supply bracket 53 and/or the docking portion 115 do not change their position. In the meantime, the gripper 103 of the robot hand 101 can insert or remove the adapter 105 into or from the centering receptacle 63.

As a result, an automatic change of an adapter 105, with the simultaneous release and clamping of a fluid-actuated clamping system in the spindle 5, is possible.

Accordingly, two second coupling parts 3 are arranged opposite one another in the C-shaped docking portion 115 of the supply bracket 53. If the robot hand 101 is positioned relative to the supply bracket 53 relative to the spindle 5 in such a way that the first coupling parts 1 of the spindle 5 and the second coupling parts 3 of the power supply bracket 53 are opposite one another, the coupling device can be closed in the manner described with reference to FIG. 2 by the actuator pistons 23 of both second coupling parts 3 being moved radially inward in the direction of the first coupling parts 1.

Two mutually opposing second coupling parts 3 according to FIGS. 1 and 2 are accommodated in FIG. 4a. As a result, the radial forces exerted on the spindle 5 by the second coupling parts 3 and/or the actuator piston 23 thereof cancel each other out when the coupling device is closed. The spindle 5 mount is not subjected to a load.

Three opposing second coupling parts 3 according to FIGS. 1 and 2 are accommodated in FIG. 4b. With this exemplary embodiment, the three coupling devices are arranged such that the resulting force from the actuator pistons enables complete or virtually complete compensation for the radial forces acting on the spindle 5.

FIG. 5 shows a further exemplary embodiment of an application of the coupling device according to the invention. It also shows a spindle 5 with a centering receptacle 63 in cross-section. The first coupling parts 1 are arranged not in the collar 65, but rather in the spindle between the bearings of the spindle 5.

With this exemplary embodiment, two second coupling parts 3 are each arranged in the housing 113 between the bearings, with actuator pistons 23 that can be actuated individually. In this case as well, the actuator pistons 23 are positioned such that they open the associated check valve 7 in the first coupling part 1 in the spindle 5 when the actuator piston 23 opens the directional valve in the second coupling part 3.

Of course, the examples shown on the basis of FIGS. 3 to 5 are not intended to be exhaustive, but are intended to explain merely by way of example how the first coupling parts 1 and the second coupling parts 3 need to be positioned relative to one another in order to be able to close or open the coupling device according to the invention upon actuation of the actuator piston 23.

A combination of FIG. 4a, 4b and FIG. 5 is also possible and expedient. In this case, the fluid would be guided into the tool holder 111 via an embodiment according to FIG. 4a or 4b, and then via the embodiment according to FIG. 5 from the housing 113 into the spindle.

Figure 6:
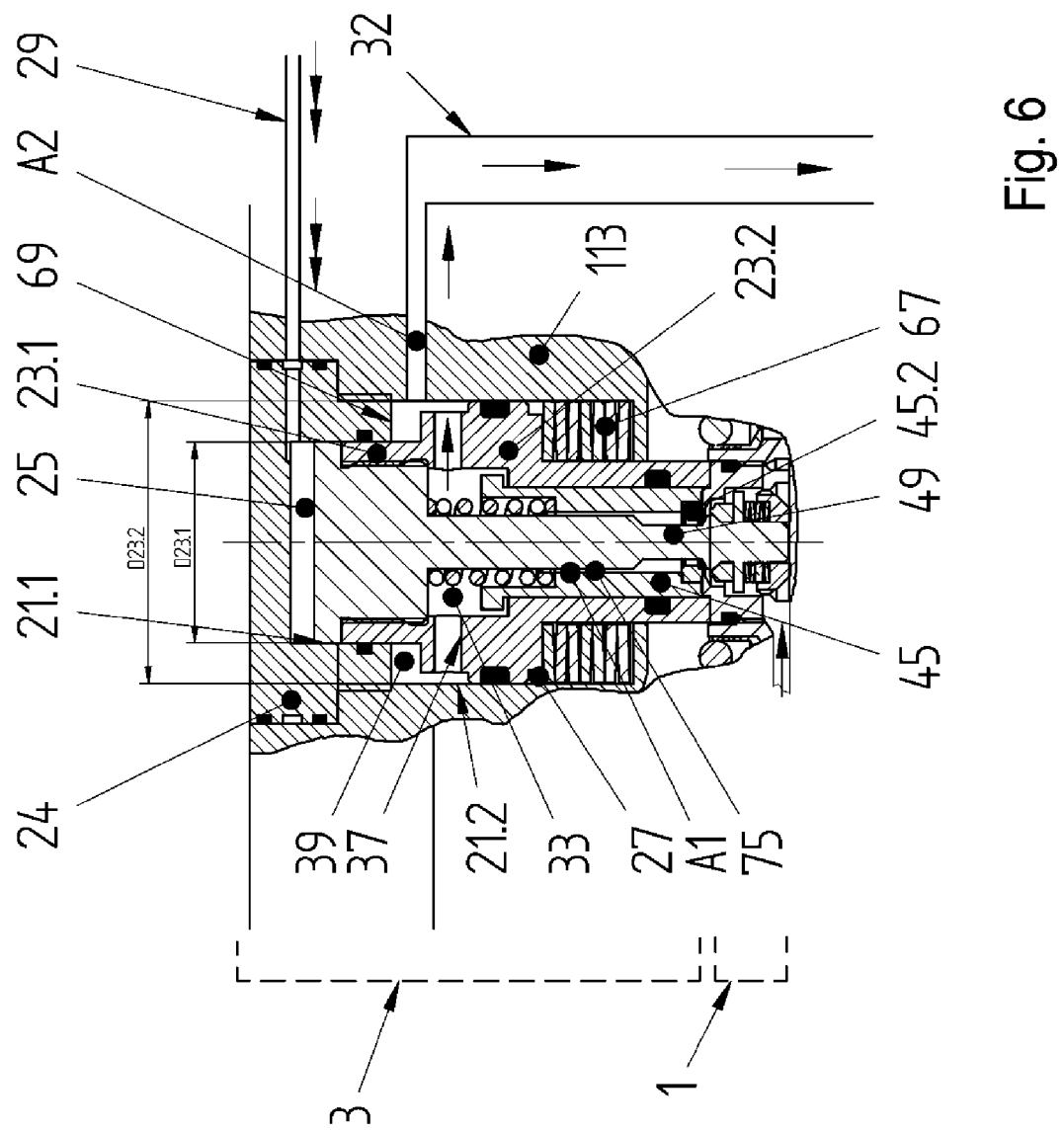
FIG. 6 shows a section through a second exemplary embodiment of a coupling device according to the invention in the closed state.

FIG. 6 shows a second embodiment of a second coupling part 3 according to the invention. The same components are provided with the same reference numerals in the various exemplary embodiments. In the following, the terms "above" and "below" are used in the description of the second coupling part 3. In this case, "below" is where the first coupling part 1 is situated.

The second exemplary embodiment requires only one control line 29 and a combined control and supply line 32; a separate supply line (41 in FIG. 1) is not required, unlike with the first exemplary embodiment.

The following explains the differences with respect to the first exemplary embodiment. Otherwise, reference is hereby made to the description of the first exemplary embodiment.

The actuator piston 23 is designed as a stepped piston. Accordingly, the cylinder bore 21 is also designed as a stepped bore. An upper part 23.1 of the actuator piston 23 with a diameter D23.1 is guided in a sealing manner in a portion 21.1 of the cylinder bore 21. This portion 21.1 is formed as a blind bore in a cover 24 which is screwed into the housing 19.

A lower part 23.2 of the actuator piston 23 with a diameter D23.2 is guided in a sealing manner in a portion 21.2 of the cylinder bore 21. This portion 21.2 is formed in the housing 19.

The diameter D23.2 of the "lower" part is greater than the diameter D23.1 of the "upper" part (D23.2>D23.1).

This means that the lower part 23.2, which is located below the cover 24, has an annular surface 69, whose projected hydraulically effective surface A69 is equal to the difference between the circular surfaces A23.2 of the lower part 23.2 of the actuator piston 23 and A23.1 of the upper part 23.1 of the actuator piston 23.

The space delimited by the second part 23.2 of the actuator piston 23 and the annular surface 69 is also referred to as third cylinder chamber 39.

It is structurally possible that the surface A23.1 of the upper part 23.1 of the actuator piston 23 is equal to the annular surface 69.

As a result, the circumferential groove 39 with this exemplary embodiment has the function of a third cylinder chamber 39; it is sometimes also referred to as this.

The stepped design of the actuator piston 23 has the following effects:

1) When a pressure is applied in the first control line 29, the fluid under pressure in the first cylinder chamber 25 exerts a hydraulic force on the actuator piston 23, said hydraulic force moving it downwards against the force of the disk springs 67 (in the position shown in FIG. 6), and a fluid connection is established between the first coupling part 1 and the second coupling part 3. Fluid can then flow out of the first coupling part 1 via the fluid chamber 33, the radial bore(s) 37 and the third cylinder chamber 39 in a unpressurized manner through the combined control and supply line 32.

2) When a pressure is applied in the control and supply line 32, the fluid under pressure in the third cylinder chamber 39 exerts a hydraulic force on the actuator piston 23, said hydraulic force likewise being moving it downwards against the force of the disk springs 67 (into the position shown in FIG. 6), and a fluid connection is established between the first coupling part 1 and the second coupling part 3. Fluid can then, for example, reach the fluid chamber 33 via the radial bore(s) 37 and be guided from there into the first coupling part.

3) When pressure is applied to the control line 29 and the control and supply line 32, the forces from the two cylinder chambers are added, and the pressurized fluid exerts a hydraulic force on the actuator piston 23, which is moved downwards against the force of the disk springs 67 (into the position shown in FIG. 6), and a fluid connection is established between the first coupling part 1 and the second coupling part 3.

In other words, to extend the actuator piston 23, it is sufficient if pressure is present in one of the cylinder chambers 25, 39.

If the surface A23.1 of the upper part 23.1 of the actuator piston 23 is equal to the annular surface 69, then—assuming the same pressure conditions—the fluid forces acting on the actuator piston 23 in both cases are equal in magnitude and are oriented in the same direction.

With the first exemplary embodiment, a fluid connection for the second cylinder chamber 27 is provided. In the second and third exemplary embodiments, disk springs 67 are present in the second cylinder chamber 27, which, when the control line 29 or the control and supply line 32 is/are depressurized, move the actuator piston 23 into a defined position, namely upward, such that the directional valve is closed. It is also possible, in addition to the disk springs 67, to supply the second cylinder chamber 27 with pressurized fluid at least temporarily via a further control line (not shown).

Between the inner diameter of the sleeve-shaped valve seat 45 and the outer diameter of the shaft of the valve tappet 49, there is a cylindrical gap 75, the surface of which is denoted by A1. When the directional valve is open, the fluid flows through this gap from the fluid chamber 33 to the first coupling part 1 or from the first 10 coupling part 1 to the fluid chamber 33.

The surface A1 is less than a cross-sectional surface A2 of the control and supply line 32, which supplies fluid to the fluid chamber 33 or discharges fluid from the fluid chamber. As a result, the gap between the inner diameter of the valve seat 45 and the outer diameter of the shaft of the valve tappet 49 has the function of a diaphragm or a throttle 75. It limits the outflow of fluid from the fluid chamber 33 through the open directional valve and keeps the pressure in the fluid chamber 33 at a high enough level so that the coupling device remains closed, and therefore the actuator piston 23 remains in the "open position."

Figure 7:
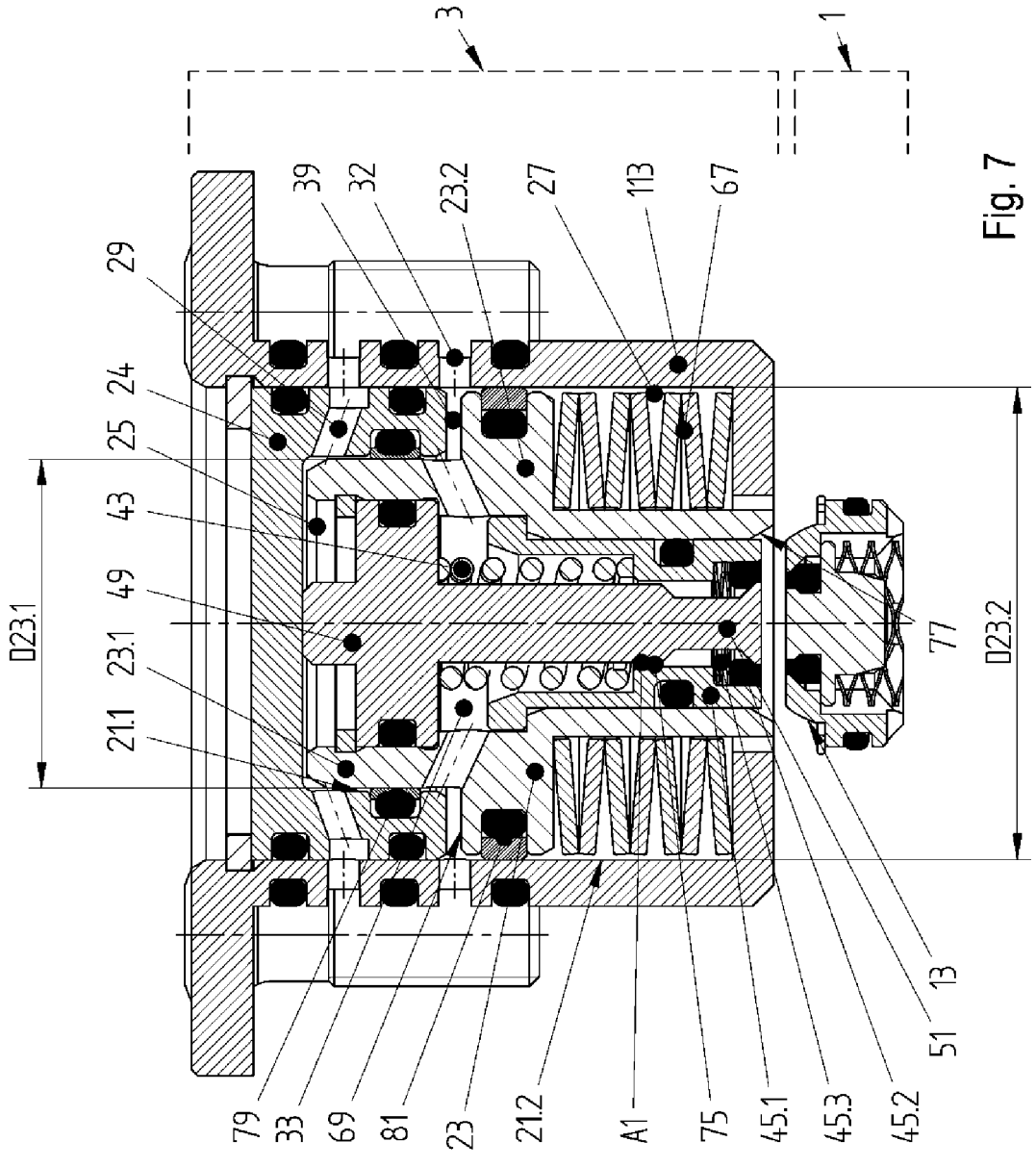
FIG. 7 shows a section through a third embodiment of a coupling device according to the invention.

FIG. 7 shows a second embodiment of a second coupling part 3 according to the invention.

The third exemplary embodiment likewise requires only one control line 29, and a combined control and supply line 32; a separate supply line 41 is not required. The structure and the hydraulic properties of the third exemplary embodiment correspond to those of the second exemplary embodiment. Therefore, in order to avoid repetitions, the differences from the second exemplary embodiment shown in FIG. 6 are explained in more detail below.

With the third exemplary embodiment, a cone 77 is provided on an end 75 of the actuator piston 23 facing the first coupling part 1. This cone 77 can also be designed as a spherical cone or dome-shaped shape. The first coupling part 1 has a dome-shaped or frustoconical shoulder 13.

When the actuator piston 23 extends in the direction of the first coupling part 1, the cone 77 centers the actuator piston 23 on the shoulder 13. In this way, an offset of the first coupling part 1 and the second coupling part 3 can be compensated for. Such an offset of, for example, 0.5 mm or one millimeter (1 mm) can result from a positioning inaccuracy of a robot hand which guides the second coupling part 3.

In order to enable a tilting or pivoting of the actuator piston 23 by a few angular degrees (for example by up to 3°), it is optionally possible for the clearance between the actuator piston 23 in the region of the first portion 21.1 of the cylinder bore 21 to be smaller than the clearance between the actuator piston 23 in the region of the second portion 21.2 of the cylinder bore 21.

A seal 79 is arranged in a groove of the cover 24 in the region of the first portion 21.1 of the cylinder bore 21. A seal 81 is arranged in a groove of the actuator piston 23 in the region of the second portion 21.2 of the cylinder bore 21. The seal 81 is designed such that it seals the third cylinder chamber 39 with respect to the second cylinder chamber 27 even in the case of a tilted position of the actuator piston 23 and/or an axial offset of the actuator piston 23 relative to the cylinder bore 21.

In this way, angular and positional errors between the first coupling piece 1 and the second coupling piece 3 of, for example, up to 3° or 1 mm can be compensated for.

In order to be able to optimally seal the two coupling pieces 1 and 3 in the case of an angular or positional offset, the valve seat 45 can be designed in several parts. In the exemplary embodiment shown in FIG. 7, it comprises a seat ring 45.2 which is displaceable in a sleeve 45.1, or is pivotably mounted. A spring element 45.3 arranged in the sleeve 45.1 presses the seat ring 45.2 against the valve plate 51. The seat ring 45.2 can become tilted within its guide in the sleeve 45.1 if the longitudinal axes of the first coupling piece 1 and the second coupling piece 3 do not run parallel to one another, but rather have an angular error of a few angular degrees.

As a result of the sum of these individual measures which can add onto one another, it is possible to compensate for possible positional and/or angular errors between the first coupling piece 1 and the second coupling piece 3 without limitations in function and tightness.

Figure 8:
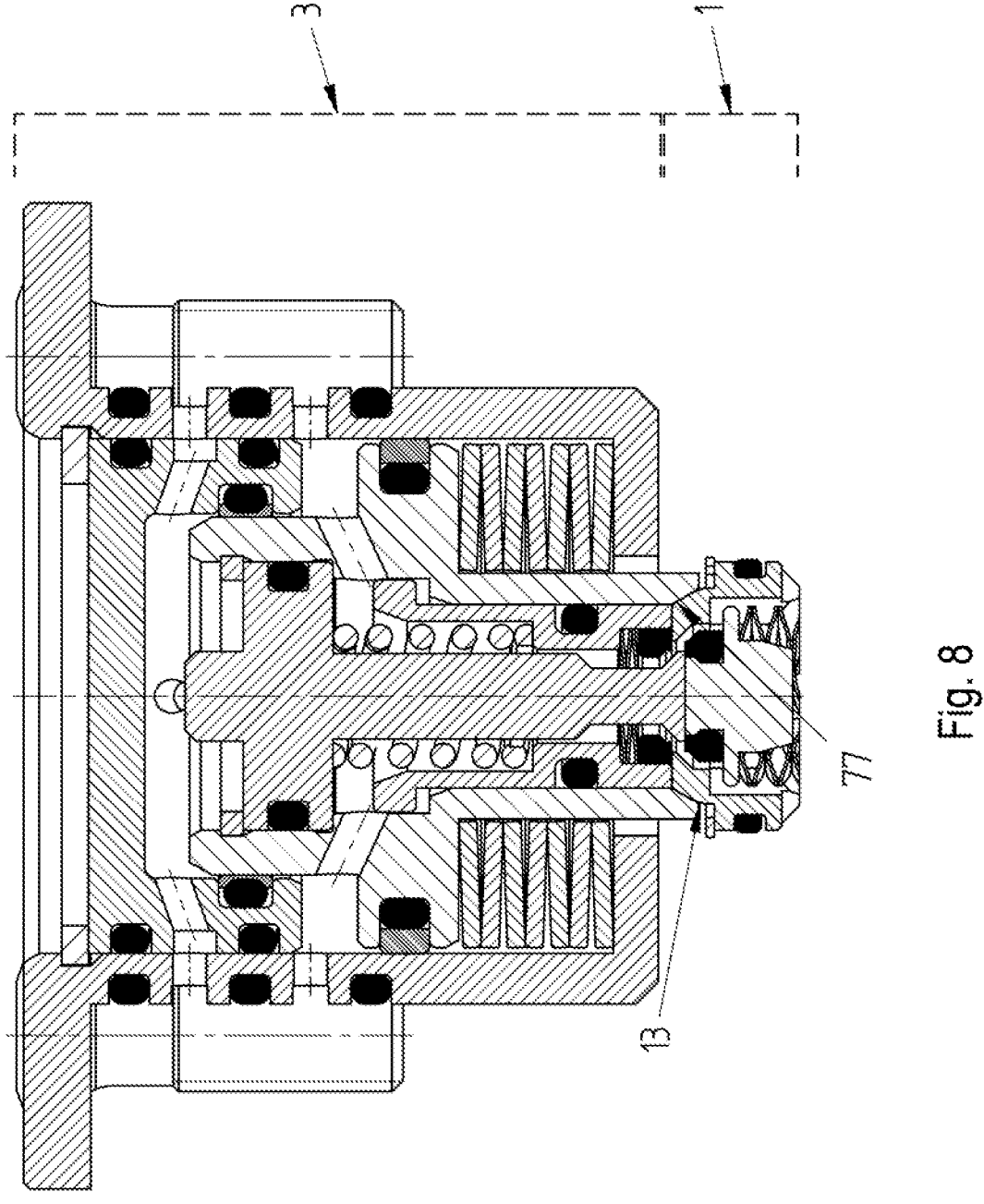
FIG. 8 shows a section through the third exemplary embodiment in the closed state.

FIG. 8 shows the third embodiment of a coupling device in the closed state. Only very few reference signs are included in this figure, in order to improve the clarity.

It can be clearly seen that the (inner) cone 77 of the actuator piston 23 is centered on the dome-shaped shoulder 13 of the first coupling part 1. Of course, as mentioned above, it is also possible to design the cone 77 to be convex, and the shoulder 13 to be conical.

The terms "offset" and "angular error" are illustrated with reference to FIG. 9. The "offset" is denoted by "Δx" in FIG. 9. It designates the distance between the longitudinal axes of the first coupling piece 1 and the second coupling piece 3 at the contact point of the coupling pieces parallel to the longitudinal axis of the second coupling piece 3.

Figure 9:
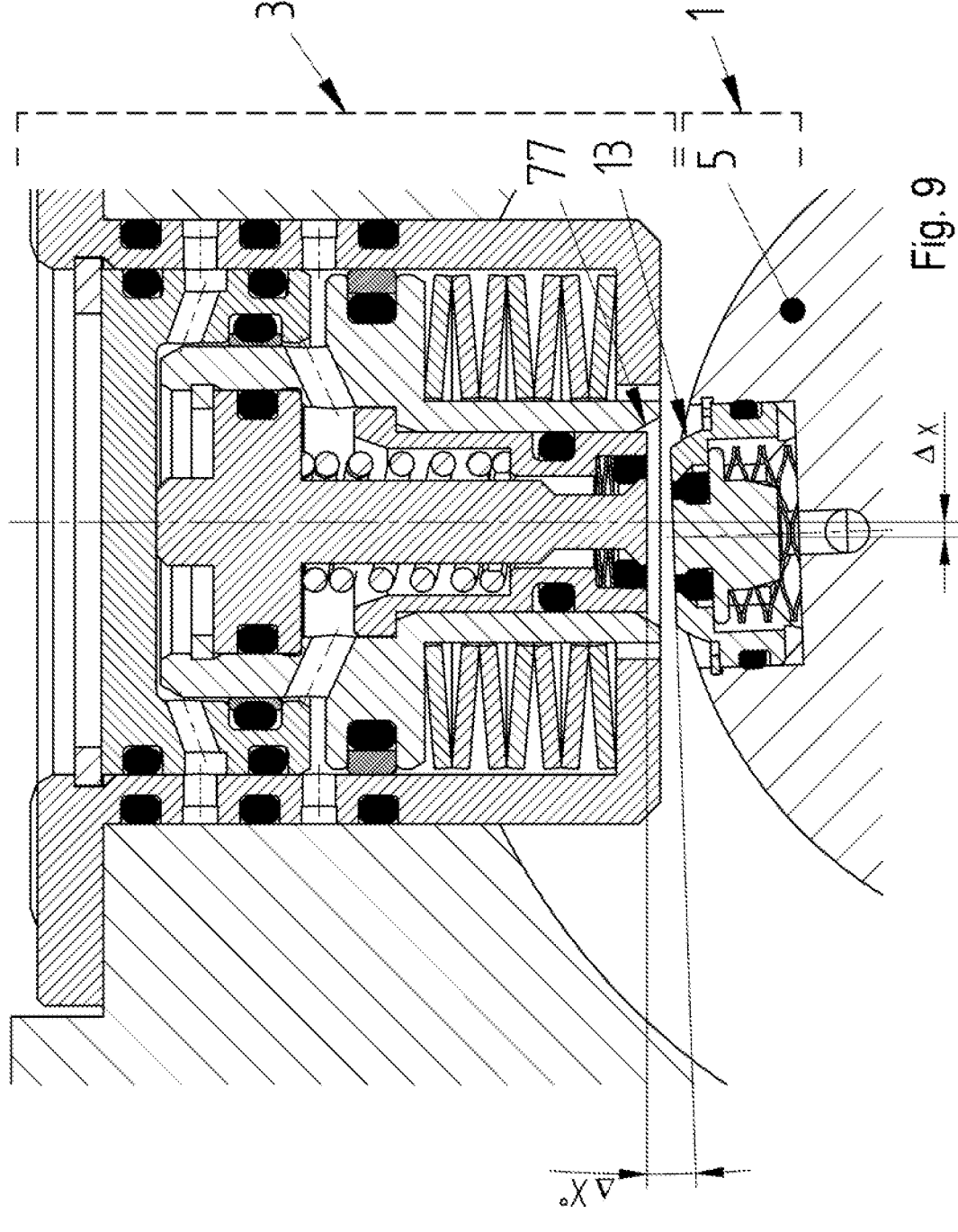
FIG. 9 shows a section through the third exemplary embodiment in an open state, with offset and angular error.

The term "angular error" is denoted by "ΔX°" in FIG. 9. It designates the angle which the contact surfaces of the first coupling piece 1 and the second coupling piece 3 have. The longitudinal axes of the first coupling piece 1 and the second coupling piece 3 are then also not parallel or concentric, but run at the angle "ΔX°" to one another.

Conventional coupling devices cannot compensate for a significant "offset" nor a significant "angular error." They then no longer close, and leakage amounts occur which are not acceptable.

Figure 10:
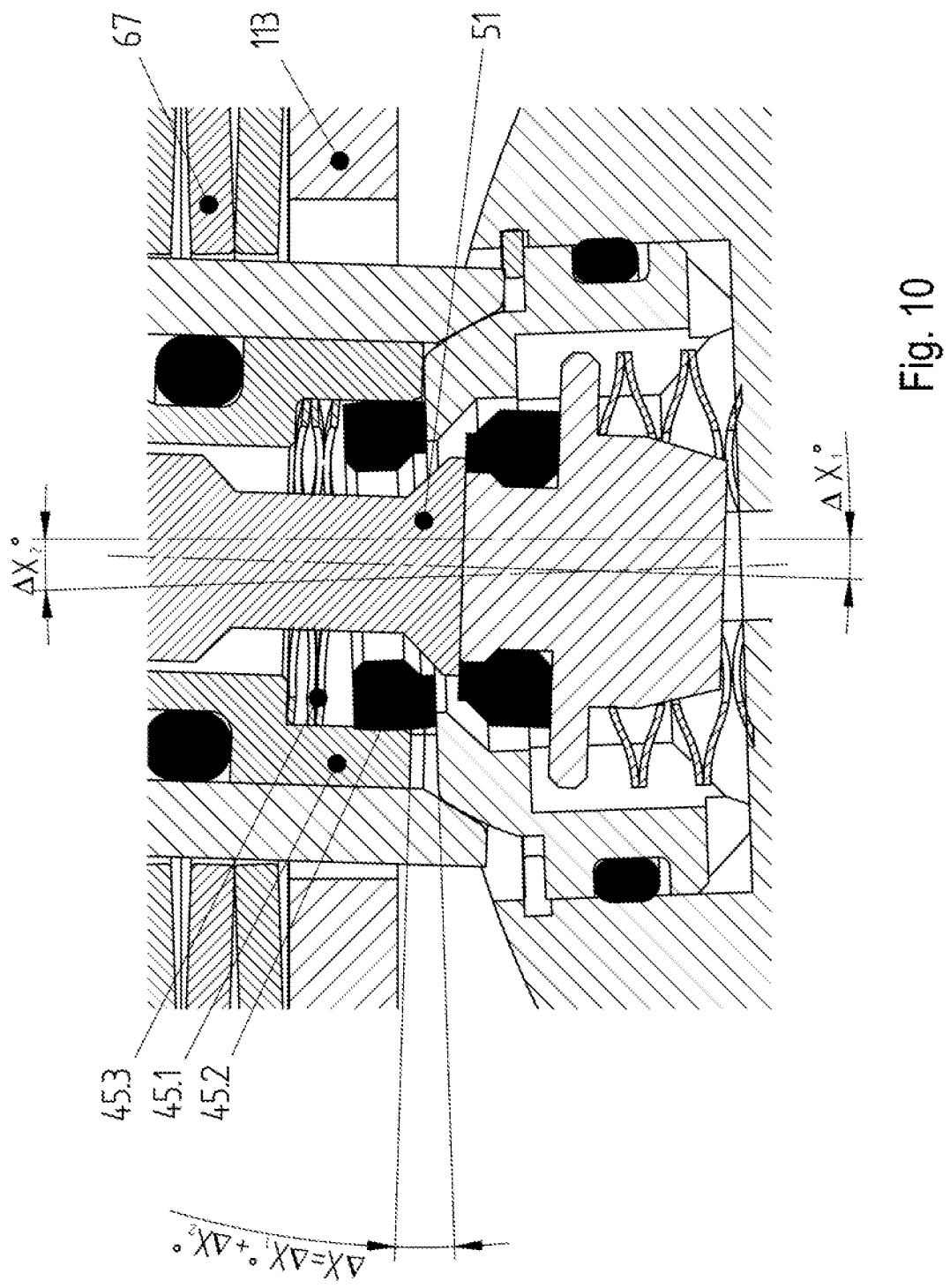
FIG. 10 shows a section through the third exemplary embodiment in a closed state to illustrate the compensation according to the invention of offset and angular errors.

FIG. 10 shows a detail of the third exemplary embodiment in the closed state. It can be clearly seen that the angular error of the contact surfaces relative to one another has increased, because the actuator piston 23, and thus the sleeve-shaped valve seat 45, also make an angular deflection as a result of the centering of the cone 77 relative to the shoulder 13. The angular error "ΔX°" is thus made up of the angular deflection "Δ_xD835_xDC4B_1°" of the spindle 5 and the angular deflection "A_xD835_xDC4B_2°" of the actuator piston 23. In this illustration, the angular error "ΔX°" is about 4°.

It can be clearly seen that, due to the dome-shaped shoulder 13, which can also be designed in the shape of a truncated cone, and the inner cone 77, which can be designed to be frustoconical or spherical in the shape of a truncated cone, a fluid-tight connection between the first coupling piece 1 and the second coupling piece 3 is established despite the angular error.

Because the seat ring 45.2 is pressed against the valve plate 51 in a spring-loaded manner, there is no consequence if the step 13 (due to the angular error "ΔX°") "strikes the seat ring 45.2.

The ability of the coupling device according to the invention to compensate for angular error and offset expands its field of application considerably. As illustrated in FIG. 9, the first coupling part 1 can be arranged in a rotatably mounted spindle 5. The rotational position of this spindle can be controlled only within a certain range of, for example, 3°. This means that, in the case of a tool change, when the coupling device needs to be closed, an angular error "ΔX°" of a few angular degrees regularly occurs during production operation. If the spindle 5 is also held, for example, by the drive (without reference numeral), the angular deviation of the spindle can result in an angular error "Δx°" and a positional error "Δx" which does not compensate itself by the closing of the coupling device itself. The coupling device must then be able to compensate for this. With the aid of the coupling device according to the invention, this angular error "Δx°" and the positional error "Δx" can be compensated for without malfunction or leakages.

Figure 11:
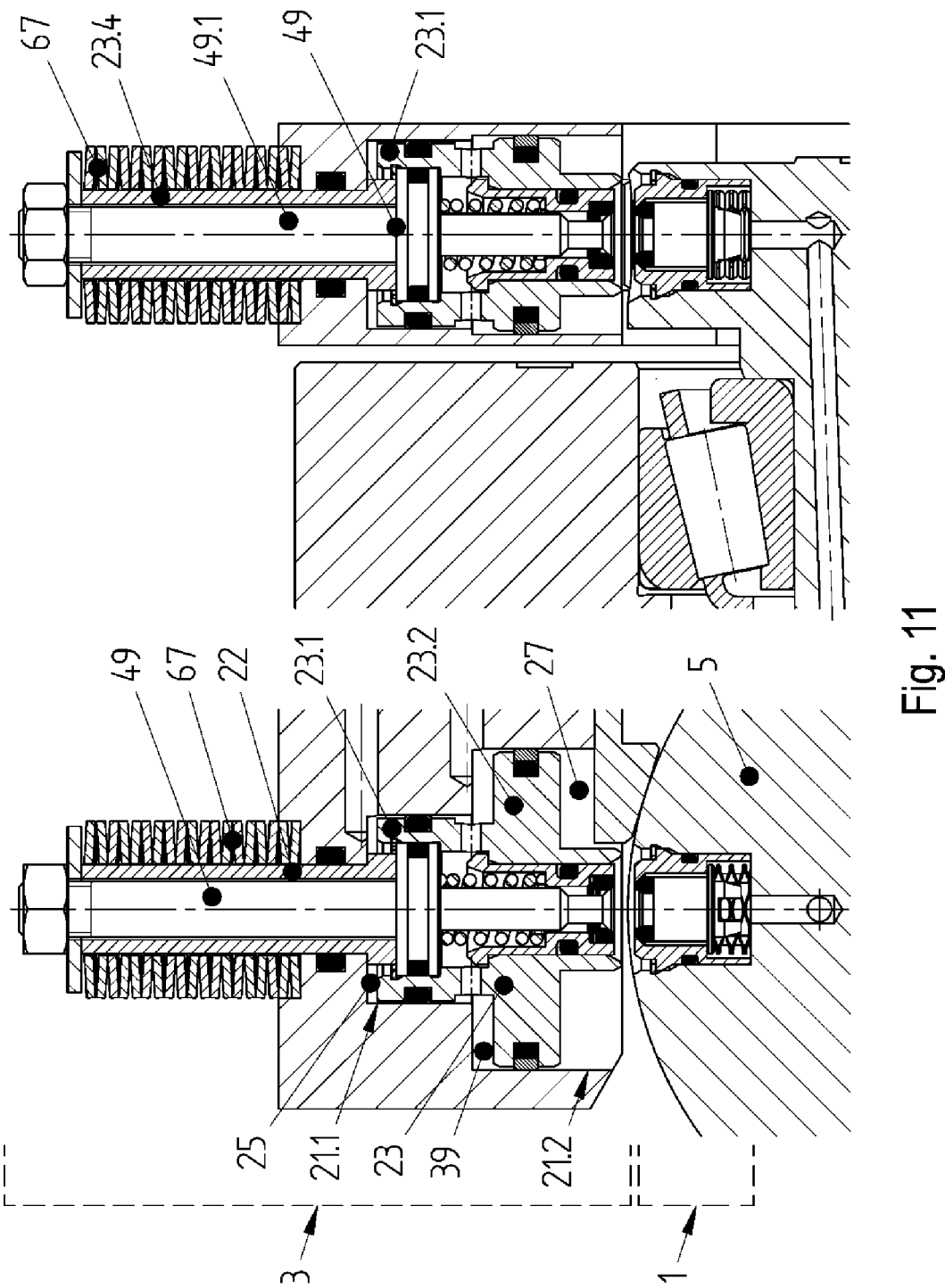
FIG. 11 shows two sections through a fourth exemplary embodiment with an oval actuator piston.

FIG. 11 shows a fourth exemplary embodiment of a coupling device according to the invention. The differences from the other exemplary embodiments relate to the second coupling part 3.

In the fourth embodiment, at least the second portion 23.2 of the actuator piston 23 is not round, but has an oval shape.

Accordingly, the second portion 21.2 of the cylinder bore 21 is also oval in cross-section. Both the oval second portion 23.2 of the actuator piston 23 and the second portion 21.2 of the cylinder bore 21 can be produced, for example, by non-circular turning or grinding.

If it is assumed that the second portion 23.2 of the actuator piston 23 and the second portion 21.2 of the cylinder bore 21 are elliptical, it is sufficient if the minor axis of the ellipse is approximately equal to the diameter D23.1 of the first portion 23.1 of the actuator piston 23.

The major axis of the ellipse is significantly larger than the diameter D 23.1 of the first portion 23.1 of the actuator piston 23. As a result, it is possible to significantly reduce the overall length of the second coupling part 3 in one direction without reducing the piston surface of the second portion 23.2 of the actuator piston 23.

With the fourth exemplary embodiment, the third compression springs 67 are not arranged in the second cylinder chamber 27, but rather outside the housing 113, 19 or above the cover 24 (if present).

The spacer sleeve 22 and the valve tappet 49 are guided through the housing 113, 19 or the cover 24 in a sealing manner, so that the spring force of the third compression spring 67 can act on the actuator piston 23 via the valve tappet 49.

The remaining structure and the hydraulic properties of the fourth exemplary embodiment correspond to those of the second and third exemplary embodiments.

The mode of operation of the second and third exemplary embodiments of the coupling device according to the invention within a housing 113 of a driven tool holder 111 is explained with reference to FIGS. 12.1 and 12.2. Two coupling devices according to the invention (each with a first coupling part 1 and a second coupling part 3) are provided in the housing 113 of the tool holder 111.

The coupling devices connect a cylinder structure 117 in the spindle to the fluid lines in the housing 113 of the tool holder 111.

With reference to FIGS. 13.1 and 13.2, the mode of operation of the second and third exemplary embodiments is illustrated and explained using a supply bracket 53 with two second coupling parts 3 and a tool holder 111 with a double-acting cylinder structure 117.

In order to illustrate the hydraulic connection configuration of FIGS. 12.1 and 12.2 within the tool holder 111, a double-acting cylinder structure 117 is shown in simplified form within the tool holder or its spindle 5. Each connection 123, 125 of the cylinder structure 117 is connected to a connection of one of the two first coupling parts 1.

The pressure prevailing in the lines is symbolized by the number of arrows (two arrows=high pressure; one arrow=low pressure).

A first fluid line 119 and a second fluid line 121 are present in the housing 113. The first fluid line 119 is connected to the first control line 29 of a second coupling part 3.1 (at the top in FIG. 12.1) and the control and supply line 32 of the other second coupling part 3.2 (below in FIG. 12.1).

The second fluid line 121 is connected to the control and supply line 32 of a second coupling part 3.1 (at the top in FIG. 12.1) and to the first control line 29 of the other second coupling part 3.2 (below in FIG. 12.1).

The two second coupling parts 3.1, 3.2 are therefore connected "crosswise" to the fluid lines 119, 121.

FIG. 12.1 shows the situation in which the first fluid line 119 is supplied with pressurized fluid (see the two arrows). The second fluid line 121 then serves to discharge the (pressure-less) fluid to be discharged from the cylinder structure 117. However, it is also possible to operate the second fluid line 121 at a lower pressure than the first fluid line 119.

In FIG. 12.1 both coupling devices are closed, i.e., there is a fluid connection between the first fluid line 119 and a first connection 123 of the cylinder structure 117. In addition, there is a fluid connection between the second fluid line 121 and a second connection 125 of the cylinder structure 117.

The fluid of the first fluid line 119 which is under high pressure passes via the first control line 29 into the first cylinder chamber 25 of the second coupling part 3.1 (at the top in FIG. 12.1). As a result, the volume of the first cylinder chamber 25 increases, the actuator piston 23 moves and opens the directional valve (along with the check valve of the first coupling part 1 which works together with it).

In this case, no high-pressure fluid (from the first fluid line 119) passes through the closed coupling device 3.1 to the cylinder structure 117 of the tool holder 111.

Rather, fluid which is discharged from the cylinder structure 117 at the second connection 125 can pass through the first coupling part 1 and the opened second coupling part 3.1, and can reach pass through this coupling device (comprising a first coupling part 1 and the second coupling part 3.1) into the second fluid line 121.

The situation is different in the second, likewise closed, second coupling device 3.2 (below in FIG. 12.1). There, the pressurized fluid from the first fluid line 119 passes via the control and supply line 32 into the third cylinder chamber 39 and the fluid chamber 33 of the second coupling part 3.2 (below in FIG. 12.1). As a result, the volume of the third cylinder chamber 39 increases, the actuator piston 23 moves and opens the directional valve (along with the check valve 7 of the first coupling part 1 which works together with it). This coupling device (comprising a first coupling part 1 and the second coupling part 3.2) is also closed as a result. The increase in size of the first cylinder chamber 25 resulting from this movement of the actuator piston 23 results in (unpressurized) fluid being sucked out of the second fluid line 121 via the first control line 29 of the second coupling part 3.2.

When this coupling device 1, 3.2 is closed, fluid under high pressure (from the first fluid line 119) passes through the third cylinder chamber and the radial bore(s) 37 into the fluid chamber 33 and the gap (throttle 75) having the surface A1 (explained above in connection with FIGS. 6 and 7) to the first coupling part 1. It passes from there via the first connection 123 into the cylinder structure 117 and moves the piston located therein (upward in FIG. 12.1).

As a result of the movement of the piston in the cylinder structure, 117 (unpressurized) fluid is expelled via the second connection 125 and, as explained above, passes via the closed coupling device 1, 3.1 into the second fluid line 121.

FIG. 12.2 shows the situation in which the first fluid line 119 is unpressurized and high pressure is present in the second fluid line 121. As a result, the direction of movement of the cylinder structure 117 is reversed.

With the second coupling part 3.1 (at the top in FIG. 12.2), the fluid chamber 33 is supplied with pressurized fluid. As a result, pressurized fluid reaches the second connection 125 of the cylinder structure 117.

With the second coupling part 3.2 (at the bottom in FIG. 12.2), the first cylinder chamber 25 is supplied with pressurized fluid. The unpressurized fluid is discharged from the first connection 123 via this coupling device 1, 3.2.

FIGS. 13.1 and 13.2 show a view from the front of a tool holder 111 and a supply bracket 53, which is equipped with second coupling parts 3 according to FIG. 6 and with the two fluid lines 119 and 121. The mode of operation has already been explained in detail with reference to FIGS. 12.1 and 12.2. Of the cylinder structure 117 which is situated in the tool holder or its spindle, the first connection 123, the second connection 125 and the cylinder 117 are shown in simplified form.

In brief, it is possible with the aid of the second coupling parts 3 shown in FIGS. 6 and 7 and of the connection configuration shown in FIGS. 12.1 and 12.2, with only two fluid lines 119, 121 to actuate the cylinder structure 117 in such a manner that the piston, and with it the piston rod, moves in both directions, to discharge the fluid displaced in the cylinder structure 117 due to the movement of the piston, and to compensate for the change in volume of the first cylinder chamber 25 in one of the two second coupling parts 3 by extending the second coupling part 3.

to compensate for the change in volume of the third cylinder chamber the other second coupling part 3 when the second coupling part 3 is extended.

With reference to FIGS. 14.1 to 14.3, the transfer of the hydraulic fluid from a housing 19 to a spindle 5 is illustrated, which is equipped with a double-acting cylinder structure 117. With reference to these figures, it can also be clearly seen what is meant by the term "crosswise."

Because the cylinder structure 117 is double-acting, two connections 123, 125 and two (numeral) first coupling parts 1.1 and 1.2 are provided in the spindle 5. Two (numeral) second coupling parts 3.1, 3.2 are provided in the housing 19.

The first coupling part 1.1 is connected to the connection 123 of the cylinder structure 117. The first coupling part 1.2 is connected to the connection 125 of the cylinder structure 117.

In FIG. 14.1, the spindle 5 is positioned such that a first coupling part 1 and a second coupling part 3 are each opposite one another. They do not touch each other (yet). The fluid in the first control lines 29.1, 29.2 and the control and supply lines 32.1, 32.2 is still unpressurized.

In FIG. 14.2, the fluid in the control and supply line 32.1 is under pressure. This is indicated by two arrows. The direction of the arrows indicates the flow direction. As a result, the third cylinder chamber 39 is also under pressure. As a result, the actuator piston 23.11 moves in the direction of the first coupling part 1.1.

Because the second coupling parts 3.1 and 3.2 are "connected crosswise," this pressure is also present in the control line 29.2 of the second coupling part 3.2 (below in FIGS. 14.1 to 14.3). From there, the pressurized fluid enters the first cylinder chamber 25.2 of the second coupling part 3.2. As a result, the actuator piston 23.12 also moves in the direction of the first coupling part 1.2.

In this connection, it is important that both actuator pistons 23 move in the direction of the first coupling pieces 1, although in one case, pressure is present in the control and supply line 32.1 and in the other case, there is pressure in the first control line 29.1. Nevertheless, both actuator pistons 23.11 and 23.12 move in the direction of the first coupling parts 1 assigned to them.

In the position of the actuator pistons 23 shown in FIG. 14.2, the sleeve-shaped valve seats 45 sit on the end faces of the shoulders 13 of the first coupling parts 1 and, if necessary, are already pre-centered by the cones 77 of the actuator piston 23 in the event of strong angular or positional deviations. The seals continue their contact, and ensure that no fluid reaches the outside. The return valves 7 of the first coupling pieces 1 are still closed because the valve tappets 49 of the second coupling parts 3 do not (yet) press them in the direction of the first coupling parts 1.1 or 1.2. Likewise, the shoulder 13 does not (yet) press the sleeve-shaped valve seats 45 far enough in the direction of the second coupling parts 3 that the seat ring 45.2 lifts off from the valve plate 51.

In the position shown in FIG. 14.3 (compared to the position shown in FIG. 14.2), actuator pistons 23.11, 23.12 have moved to such an extent in the direction of the first coupling parts 1 that the valve tappets 49 of the first coupling parts 3 have lifted the valve members 9 of the check valves 7 from their seats against the force of the first compression spring 17. At the same time, the sleeve-shaped valve seat was pressed by the shoulder 13 in the direction of the second coupling part, such that the seat ring 45.2 lifts off from the valve plate 51. This means that the coupling devices are open (open position).

In the open position, the pressurized fluid flows from the control and supply line 29.1 through the open coupling device 3.1, 1.1 through the connection 123 into a first working chamber 127 of the cylinder structure 117, and moves the piston 129 thereof (to the left in FIGS. 14.2 and 14.3).

The piston 129 displaces the unpressurized fluid from the other cylinder chamber 131. This displaced fluid passes through the connection 125, the open coupling device 1.2, 3.2 into the control and supply line 29.2. When the piston 129 of the cylinder structure 117 is moved in the opposite direction, the control and supply line 32.12 of the second coupling part 3.2 (below in FIGS. 14.1 to 14.3) and the control line 29.1 of the second coupling part 3.1 (at the top in FIGS. 14.1 to 14.3) are subjected to pressurized fluid.

LIST OF REFERENCE SIGNS

1 first coupling part
3 second coupling part
5 spindle
7 check valve
9 valve member
11 valve housing
13 shoulder
15 opening
16 sealing ring
17 first compression spring
19 housing
21 cylinder bore
23 actuator piston
24 cover
25 first cylinder chamber
27 second cylinder chamber
29 first control line
31 second control line
32 control and supply line
33 fluid chamber
37 radial bore
39 circumferential groove, third cylinder chamber
41 supply line
43 second compression spring
45 sleeve-shaped valve seat
45.1 sleeve
45.2 seat ring
45.3 spring element
47 guide bore
49 valve tappet

51 valve plate
53 supply bracket
63 centering receptacle
65 collar
67 third compression spring, disk spring
69 annular surface
73 projection
75 throttle
77 cone
79 first (actuator piston) seal
81 second (actuator piston) seal
101 robot hand
103 gripper
105 adapter
107 cutting tool, drill
109 hollow shaft
111 tool holder
113 housing of the tool holder
115 docking portion
117 cylinder structure
119 first fluid line
121 second fluid line
123 first connection of the cylinder structure 117
125 second connection of the cylinder structure 117
127 first cylinder chamber
129 piston
131 second cylinder chamber

What is claimed is:

1. A tool holder comprising a housing, a spindle, a centering receptacle arranged in the spindle for receiving an adapter, and a clamping system actuated by a fluid for clamping and detaching the adapter in the centering receptacle, wherein at least one first coupling part is present in the spindle,
wherein at least one second coupling part is present in the housing,
wherein the first coupling part and the second coupling part are suitable for working together to form a coupling device for a fluid,
wherein the first coupling part is formed as a spring-loaded, double check valve,
wherein the second coupling part comprises an actuator piston guided displaceably in the housing, and
wherein an outwardly opening directional valve is arranged in the actuator piston, characterized in that the actuator piston divides a cylinder bore into a first cylinder chamber and a second cylinder chamber.

2. The tool holder according to claim 1, characterized in that each first coupling part has a shoulder on its end facing the second coupling part, which dips into a guide bore of the second coupling part when the coupling device is closed, wherein the fluid chamber of the second coupling part opens into the guide bore, wherein a sleeve-shaped valve seat of the directional valve is accommodated displaceably in the guide bore, and wherein a valve tappet of the directional valve is connected to the actuator piston and projects through the sleeve-shaped valve seat.

3. The tool holder according to claim 1, characterized in that the check valves of the first coupling parts are arranged radially relative to the axis of the centering receptacle.

4. The tool holder according to claim 1, comprising two of the second coupling parts, and also a first fluid line and a second fluid line, characterized in that each second coupling part comprises a first control line and a second control line, in that the first control line of the first second coupling part and the second control line of the second coupling part are connected to the first fluid line, and in that the second control line of the first second coupling part and the first control line of the second coupling part are connected to the second fluid line.

5. The tool holder according to claim 1, characterized in that the fluidic actuation of the clamping system comprises a single-acting cylinder structure, and in that the first coupling part for the supply of the cylinder structure is provided for clamping and releasing the clamping system.

6. The tool holder according to any of claim 1, characterized in that the fluidic actuation of the clamping system comprises a double-acting cylinder structure, and in that two of the first coupling parts for the supply of the connections of the cylinder structure are provided for clamping and releasing the clamping system.

7. A tool holder comprising a housing, a spindle, a centering receptacle arranged in the spindle for receiving an adapter, and a clamping system actuated by a fluid for clamping and detaching the adapter in the centering receptacle, wherein at least one first coupling part is present in the spindle, wherein at least one second coupling part is present in the housing, wherein the at least one first coupling part and the at least one second coupling part are suitable for working together to form a coupling device for a fluid, wherein the at least one first coupling part is formed as a spring-loaded, double check valve, wherein the at least one second coupling part comprises an actuator piston guided displaceably in the housing, and wherein an outwardly opening directional valve is arranged in the actuator piston, characterized in that the actuator piston is designed as a stepped piston, in that a first part of the actuator piston delimits a first cylinder chamber in that a second part of the actuator piston delimits a second cylinder chamber, and in that a diameter of the first part of the actuator piston is smaller than a diameter of the second part of the actuator piston, such that a third cylinder chamber with an annular surface is present at the transition between the first part and the second part of the actuator piston.

8. A tool holder comprising a housing, a spindle, a centering receptacle arranged in the spindle for receiving an adapter, and a clamping system actuated by a fluid for clamping and detaching the adapter in the centering receptacle, wherein at least one first coupling part is present in the spindle, wherein at least one second coupling part is present in the housing, wherein the first coupling part and the second coupling part are suitable for working together to form a coupling device for a fluid, wherein the first coupling part is designed as a spring-loaded, double check valve, wherein the second coupling part comprises an actuator piston guided displaceably in the housing, wherein an outwardly opening directional valve is arranged in the actuator piston, characterized in that the first coupling part has a shoulder on an end of the first coupling part, the shoulder facing the second coupling part, which dips into a guide bore of the second coupling part when the coupling device is closed, wherein a fluid chamber of the second coupling part opens into the guide bore, wherein a sleeve-shaped valve seat of the directional valve is accommodated displaceably in the guide bore, and wherein a valve tappet of the directional valve is connected to the actuator piston and projects through the sleeve-shaped valve seat of the directional valve.

9. A supply bracket comprising at least one second coupling part which is suitable for working together with a first coupling part to form a coupling device for a fluid, wherein the first coupling part is formed as a spring-loaded, double check valve, wherein the second coupling part comprises an actuator piston guided displaceably in a housing, wherein an outwardly opening directional valve is arranged in the actuator piston, wherein the actuator piston divides a cylinder bore into a first cylinder chamber and a second cylinder chamber, wherein the supply bracket comprises a C-shaped docking portion, and wherein at least two of the second coupling parts are arranged on the docking portion.

10. The supply bracket according to claim 9, characterized in that each second coupling part is compatible with the first coupling part of a tool holder comprising the housing, a spindle, a centering receptacle arranged in the spindle for receiving an adapter, and a clamping system actuated by a fluid for clamping and detaching the adapter in the centering receptacle, wherein at least one further first coupling part is present in the spindle, wherein the at least one second coupling part is present in the housing, wherein the first coupling part and the second coupling part are suitable for working together to form the coupling device for the fluid, wherein the first coupling part is formed as the spring-loaded, double check valve, wherein the second coupling part comprises an actuator piston guided displaceably in the housing, and wherein the outwardly opening directional valve is arranged in the actuator piston, characterized in that the actuator piston divides the cylinder bore into a first cylinder chamber and the second cylinder chamber.

11. The supply bracket according to claim 9, characterized in that the supply bracket comprises two of the second coupling parts, and also a first fluid line and a second fluid line, in that each second coupling part comprises a first control line and a second control line, in that the first control line of the first second coupling part and the second control line of the second coupling part are connected to the first fluid line, and in that the second control line of the first second coupling part and the first control line of the second coupling part are connected to the second fluid line.

12. The supply bracket according to claim 9, characterized in that the supply bracket comprises at least two of the second coupling parts, and in that each second coupling part is compatible with the first coupling part of a tool holder.

13. The supply bracket according to claim 12, characterized in that the at least two second coupling parts are arranged such that the forces exerted by valve tappets of the second coupling parts on the first coupling parts completely or at least largely cancel each other out.

14. The supply bracket according to claim 9, characterized in that a clearance between the cylinder bore and the actuator piston on an end of the actuator piston facing away from the first coupling part is smaller than a clearance between the cylinder bore and the actuator piston on the end thereof facing the first coupling part.

15. The supply bracket according to claim 9, characterized in that a first seal is provided on the end of the actuator piston facing away from the first coupling part, and a second seal is provided on the end of the actuator piston facing the first coupling part, and in that the second seal is flexible in the radial direction such that the second seal seals the second cylinder chamber even if the actuator piston is tilted or offset relative to the cylinder bore.

16. The supply bracket according to claim 15, characterized in that the second seal seals a third cylinder chamber relative to the second cylinder chamber.

17. The supply bracket according to claim 15, characterized in that the fluid chamber is fluidically connected to a supply line in the housing or in the supply bracket via a circumferential groove which is present on the outside of the actuator piston, and via at least one radial bore, and is supplied with fluid, at least in the open position of the directional valve.

18. The supply bracket according to claim 9, characterized in that a fluid chamber is formed in the actuator piston in such a way that the fluid chamber is closed on one end, in that the fluid chamber opens into a guide bore, in that a sleeve-shaped valve seat of the directional valve is displaceably accommodated in the guide bore, and in that a valve tappet of the directional valve is coupled to the actuator piston and projects through the sleeve-shaped valve seat, such that a valve plate of the valve tappet limits the path of the valve seat in the guide bore.

19. The supply bracket according to claim 18, characterized in that the valve seat comprises a sleeve and a seat ring received and guided in the sleeve, and also a spring element, and in that the spring element is supported on one end on the sleeve and on the other end on the seat ring.

20. The supply bracket according to claim 19, characterized in that a second compression spring is arranged in the fluid chamber, and in that a spring force exerted by the second compression spring on the valve seat presses the valve seat against the valve plate of the valve tappet.

21. The supply bracket according to claim 20, characterized in that a third compression spring is arranged in the second cylinder chamber or outside the housing or the supply bracket, and the spring force thereof on the actuator piston counteracts the pressure forces of a fluid located in the first cylinder chamber or/and a third cylinder chamber.

22. The supply bracket according to claim 21, characterized in that the fluid chamber can be supplied with fluid via a supply line or a combined control and supply line at least in the open position of the directional valve.

23. The supply bracket according to claim 18, characterized in that a throttle or orifice is present between the fluid chamber and the directional valve, so that, when the directional valve is open, the outflow of pressurized fluid from the fluid chamber is limited and a minimum overpressure in the fluid chamber and in a third cylinder chamber is maintained.

24. The supply bracket according to claim 23, characterized in that the throttle is designed as an annular gap between the valve tappet and the valve seat or its sleeve.

25. The supply bracket according to claim 18, characterized in that the check valve of the first coupling part comprises a valve housing, in that an opening for the fluid, which is connected to the check valve, is formed on the valve housing, in that the opening is formed in a shoulder of the valve housing, and in that, when the coupling device is closed, a shoulder dips into the guide bore of the second coupling part, and the valve seat of the directional valve lifts off from the valve plate of the valve tappet, and in that a line in the housing or of a spindle is opened or closed by the check valve.

26. The supply bracket according to claim 25, characterized in that the shoulder of the valve housing is designed to be frustoconical or dome-shaped.

27. The supply bracket according to claim 9, characterized in that the first cylinder chamber can be supplied with fluid via a first control line.

28. The supply bracket according to claim 9, characterized in that the second cylinder chamber can be supplied with fluid via a second control line.

29. The supply bracket according to claim 9, characterized in that the actuator piston comprises a first portion and a second portion, and the cylinder bore comprises a first portion and a second portion, characterized in that at least the second portion of the actuator piston has an oval or elliptical cross-section, and in that at least the second portion of the cylinder bore has an oval or elliptical cross-section.

30. The supply bracket according to claim 9, characterized in that the actuator piston has a cone or an inner dome on its end facing the first coupling part, and in that the first coupling part has a shoulder on its end facing the second coupling part.

31. A supply bracket comprising at least one second coupling part which is suitable for working together with a first coupling part to form a coupling device for a fluid, wherein the first coupling part is formed as a spring-loaded, double check valve, wherein the at least one second coupling part comprises an actuator piston guided displaceably in a housing, and wherein an outwardly opening directional valve is arranged in the actuator piston, wherein the actuator piston is designed as a stepped piston, wherein a first part of the actuator piston delimits a first cylinder chamber, wherein a second part of the actuator piston delimits a second cylinder chamber, and in that a diameter of the first part of the actuator piston is smaller than a diameter of the second part of the actuator piston, such that a third cylinder chamber with an annular surface is present at the transition between the first part and the second part of the actuator piston, wherein the supply bracket comprises a C-shaped docking portion, and wherein at least two of the second coupling parts are arranged on the docking portion.

32. The supply bracket according to claim 31, characterized in that the third cylinder chamber and a fluid chamber are simultaneously supplied with fluid via the control and supply line.

33. A rotary machine, comprising at least one tool holder comprising a housing, a spindle, a centering receptacle arranged in the spindle for receiving an adapter, and a clamping system actuated by a fluid for clamping and detaching the adapter in the centering receptacle, wherein at least one first coupling part is present in the spindle, wherein at least one second coupling part is present in the housing, wherein the first coupling part and the second coupling part are suitable for working together to form a coupling device for a fluid, wherein the first coupling part is formed as a spring-loaded, double check valve, wherein the second coupling part comprises an actuator piston guided displaceably in the housing, and wherein an outwardly opening directional valve is arranged in the actuator piston, wherein the actuator piston divides a cylinder bore into a first cylinder chamber and a second cylinder chamber in that the fluidic actuation of the clamping system comprises a cylinder structure, and in that the at least one first coupling part for the supply of the cylinder structure is provided for clamping and releasing the clamping system.

34. The rotary machine according to claim 33, characterized in that the rotary machine is equipped with a supply bracket comprising the at least one second coupling part which is suitable for working together with the first coupling part to form the coupling device for the fluid, wherein the first coupling part is formed as the spring-loaded, double check valve, wherein the at least one second coupling part comprises the actuator piston guided displaceably in the housing, wherein the outwardly opening directional valve is arranged in the actuator piston, wherein the actuator piston divides the cylinder bore into the first cylinder chamber and the second cylinder chamber, wherein the supply bracket comprises a C-shaped docking portion, and wherein at least two of the second coupling parts are arranged on the docking portion.

* * * * *